US012585383B2

(12) United States Patent
Jana

(10) Patent No.: US 12,585,383 B2
(45) Date of Patent: Mar. 24, 2026

(54) METHOD AND SYSTEM FOR HARDWARE ACCELERATED ONLINE CAPACITY EXPANSION

(71) Applicant: Avago Technologies International Sales Pte. Limited, Singapore (SG)

(72) Inventor: Arun Prakash Jana, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 52 days.

(21) Appl. No.: 18/497,847

(22) Filed: Oct. 30, 2023

(65) Prior Publication Data

US 2025/0138728 A1     May 1, 2025

(51) Int. Cl.
*G06F 3/06*          (2006.01)
(52) U.S. Cl.
CPC .......... *G06F 3/0604* (2013.01); *G06F 3/0644* (2013.01); *G06F 3/0689* (2013.01)

(58) Field of Classification Search
None
See application file for complete search history.

(56) References Cited

U.S. PATENT DOCUMENTS

| 2010/0115210 A1* | 5/2010 | Wicklund | ............. G06F 3/0632 |
| | | | 711/E12.001 |
| 2013/0290626 A1* | 10/2013 | Sundrani | ............. G06F 11/1096 |
| | | | 711/E12.001 |
| 2021/0181958 A1* | 6/2021 | Fujii | ..................... G06F 3/0632 |

* cited by examiner

*Primary Examiner* — Arpan P. Savla
*Assistant Examiner* — Edmund H Kwong
(74) *Attorney, Agent, or Firm* — King Intellectual Asset Management

(57)                ABSTRACT

Solutions for managing RAID logical devices. Some solutions provide enhanced online capacity expansion for virtual disks on RAID drives, for example by taking advantage of the hardware capabilities to expand a virtual disk stripe by stripe. Some solutions provide increase hardware automation, which can reduce firmware load and/or provide more efficient input-output operations (IO) for the online capacity expansion operation.

20 Claims, 14 Drawing Sheets

405  Manage Virtual Disk

410  Operate Task Ring

415  Communicate IOs

420  Receive host IO/ Parent ACIO

425  Divert host IO

430a  Create Parent ACIO

430b  Create Child IOs

435  Communicate ACIO(s)

440  Create Drive IOs

445  Execute Drive IOs

450  Confirm IOs

400

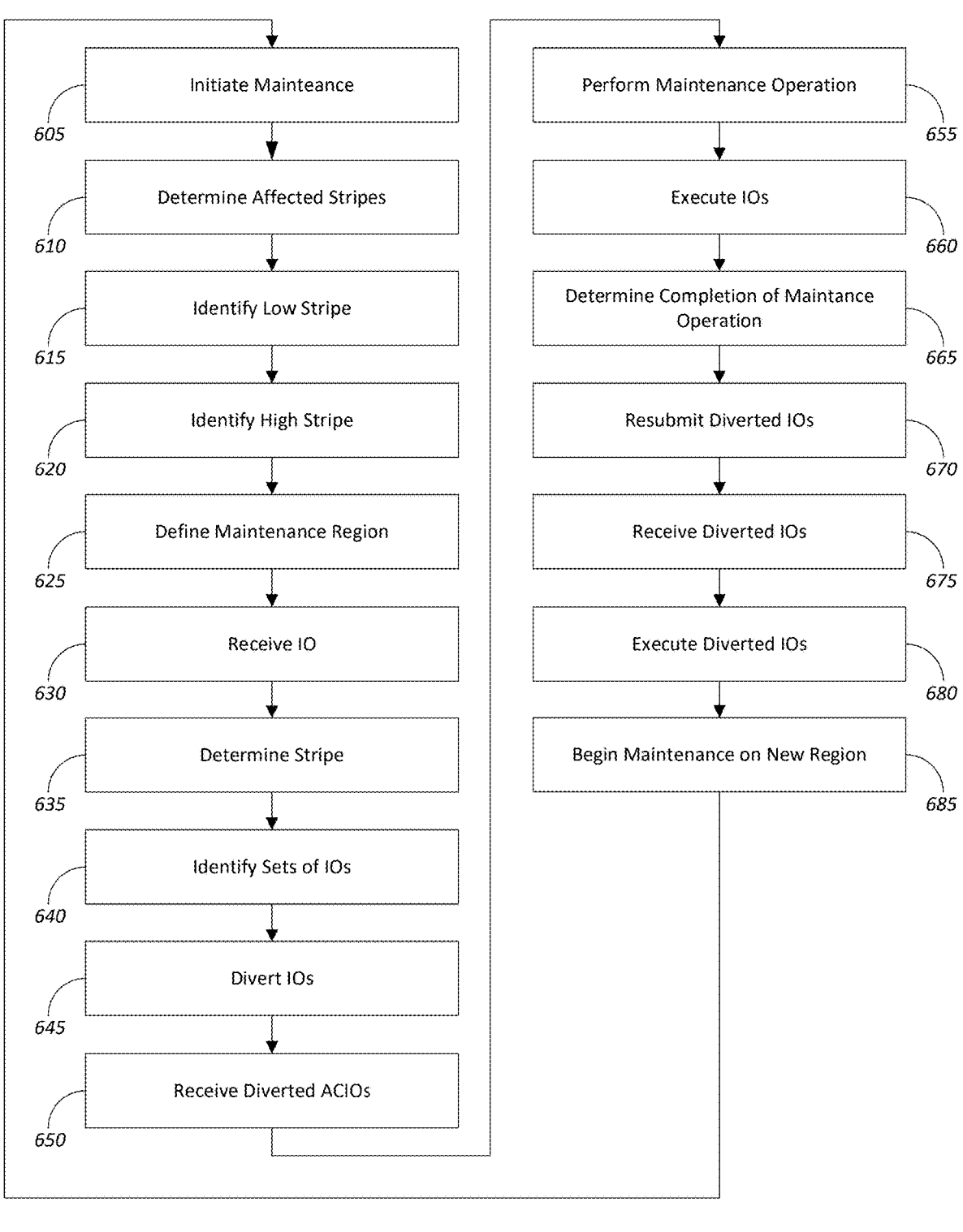

Initiate Mainteance

605

Determine Affected Stripes

610

Identify Low Stripe

615

Identify High Stripe

620

Define Maintenance Region

625

Receive IO

630

Determine Stripe

635

Identify Sets of IOs

640

Divert IOs

645

Receive Diverted ACIOs

650

Perform Maintenance Operation

655

Execute IOs

660

Determine Completion of Maintance Operation

665

Resubmit Diverted IOs

670

Receive Diverted IOs

675

Execute Diverted IOs

680

Begin Maintenance on New Region

METHOD AND SYSTEM FOR HARDWARE ACCELERATED ONLINE CAPACITY EXPANSION

CROSS-REFERENCES

This application may be related to U.S. patent application Ser. No. 18/497,876, filed on a date even herewith by Jana and titled, "Watermarked IO Diverts for Virtual Disks", the entire disclosure of which is incorporated herein by reference.

TECHNICAL FIELD

This disclosure relates generally to RAID storage systems and more particularly to solutions for managing virtual disks in a RAID environment.

BACKGROUND

A redundant array of independent disks (RAID) storage system can logically consolidate multiple physical disks into one or more consolidated pools of storage resources. A physical disk is an actual hardware storage device, such as a hard disk drive (HDD), solid state drive (SSD) and/or the like. In many cases, a RAID controller will handle the management of these resources and will allocate the resources into one or more virtual disks (also known as logical devices), each of which appears to the host (e.g., a computer operating system in communication with the controller) to be a single physical disk.

Online capacity expansion (OCE) is one such operation, in which new physical disks are added to an existing virtual disk to expand it. Organizations frequently require capacity expansion to increase the amount of available space on a virtual disk to write new data. Often, this capacity expansion is carried out as an annual maintenance activity, in anticipation of the additional capacity required in the next year. Some modern RAID controllers offer OCE of virtual disks to expand the virtual disks while the virtual disks are online (i.e., available for host IOs). The procedure involves adding new drives to a virtual disk and redistributing the existing data. In some cases, firmware creates a ghost virtual disk with the additional drives and starts transferring the data from the original (source) virtual disk layout to the layout of the ghost virtual disk using firmware issued IOs.

The concept behind OCE is that the virtual disk remains online, i.e., available to service requests from a host. OCE, however, can be a slow process that imposes performance penalties, degrades the user experience and introduces temporary limitations on the flexibility and/or security of the virtual disk. As a result, any improvement to the speed of an OCE operation is valuable. Typically, however, OCE is a fairly complex, and therefore firmware driven, process, in which the firmware provides detailed instructions to the hardware on how to perform the operations to move data around on the physical disks in order to expand the virtual disk with additional physical disks.

OCE can be considered one of several maintenance tasks in which firmware in the RAID controller performs in the management of a virtual disk. Modern RAID controllers support several firmware operations, such as OCE, which keep running on virtual disks while those devices are online and available for host input-output operations. To maintain the ability of the virtual disk to service hosts requests during maintenance, the controller hardware will divert all the input-output (IO) requests for that virtual disk received from the host (host IO) to be diverted to firmware, to ensure that the host IOs do not overlap with the firmware's IOs in performing the maintenance; such overlap leads to data corruption.

OCE and other maintenance operations rely heavily on firmware controlled IOs (both for the maintenance operations and to write any diverted host IOs). Because the controller hardware is not aware of the region on which firmware is operating, it diverts all the host IOs for the entire virtual disk to firmware, which can decide how to handle each host IO case by case. This produces substantial inefficiencies because the controller firmware operates much more slowly than hardware. All host IOs, and in the case of OCE, the maintenance IOs required to rewrite all of the data on the virtual disk, must wait until scheduled by firmware.

At the same time, however, firmware operations are active only on a specific region of the virtual disk at any given time; as the firmware operates, the affected region usually progresses from the beginning to the end of the virtual disk. Likewise, in an OCE (among other maintenance operations), the firmware imposes several bottlenecks that reduce the speed (and thus increase the duration) of the OCE operation. Thus, there is a need for solutions that provide additional functionality to allow the controller hardware to carry more of the burden of OCE and other maintenance tasks.

BRIEF DESCRIPTION OF THE DRAWINGS

FIG. 6 illustrates a method of performing a maintenance operation on a virtual disk in accordance with some embodiments.

DETAILED DESCRIPTION

Figure 1A:
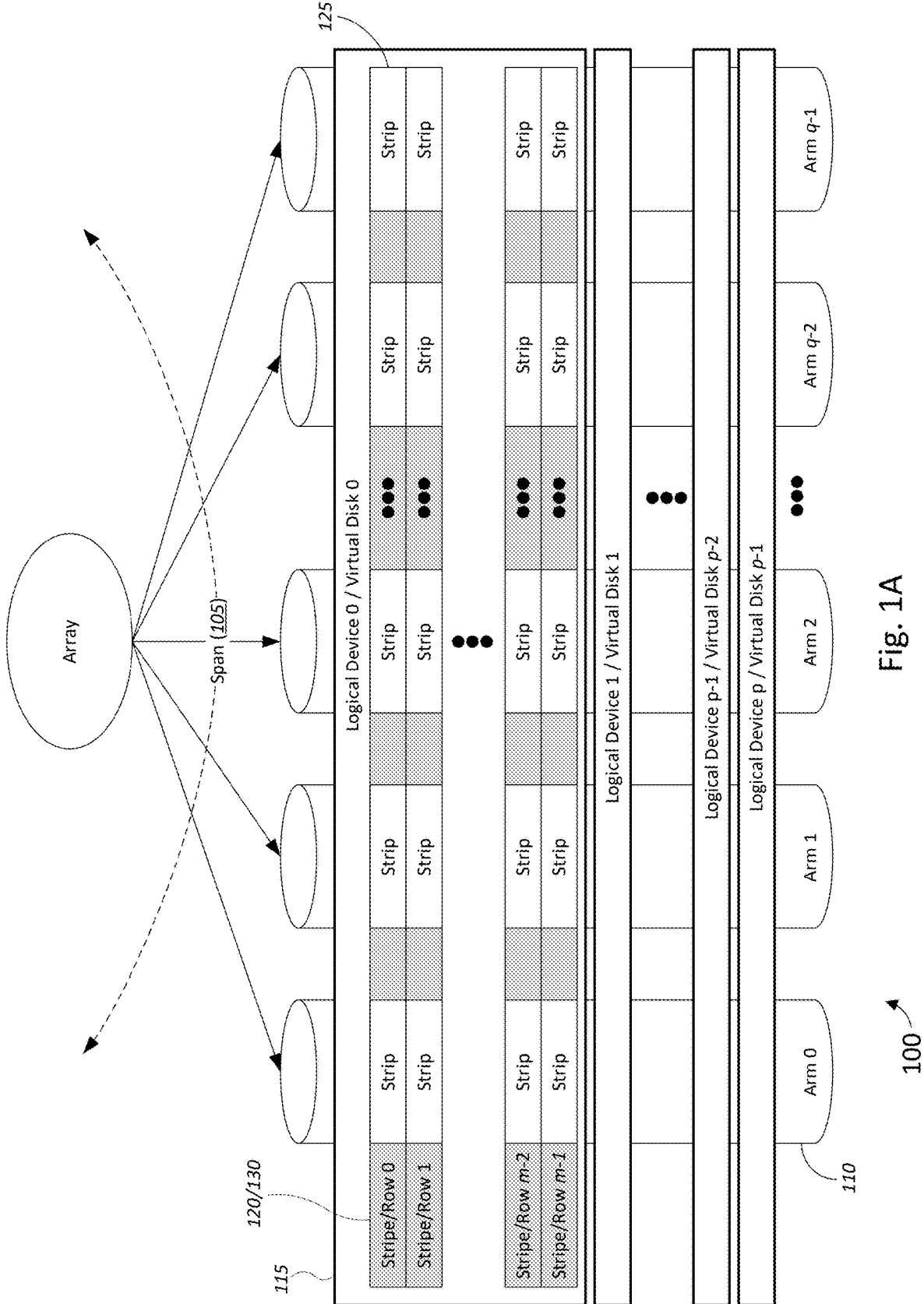
FIGS. 1A, 1B, 2, and 5 illustrate virtual disks in accordance with some embodiments.

Various embodiments provide solutions, including without limitation devices, systems and methods, for managing RAID virtual disks. Such devices are not limited to any particular form factor or hardware arrangement and can include any device that is capable of performing the operations described herein. Exemplary devices can include microprocessors, systems on a chip (SoC), PCBs with one or more circuits, chips, memory, etc. installed thereon (e.g., a RAID controller), computers, and/or the like. Systems can include any collection of devices that includes at least one device that individually or collectively is capable of performing the operations described herein. Similarly, methods provided by various embodiments can be performed by any capable device or system (or otherwise) and are not limited to any particular physical or logical implementation.

Some embodiments enable increased use of hardware circuitry to schedule and perform IO on a virtual drive, providing for much more efficient IO. For example, some embodiments enable increased efficiency in OCE operations by shifting much of the operational load from firmware to hardware; for example, by automating the OCE operations in the hardware at the stripe level of the virtual disk. As explained below, this presents a substantial advance over existing OCE solutions. As described below, in a typical OCE operation, the firmware provides instructions to the hardware to rewrite all of the data from the existing layout of the virtual disk (without the additional physical disks to be added) to an expanded layout of the virtual disk (which includes the additional physical disks). This is a time-consuming process, largely due to the relatively low performance of the firmware in controlling the transfer of large amounts of data using granular read operations from the existing disk and granular write operations to expanded disk. Certain embodiments, as described below, allow the firmware to provide fewer, and broader, instructions to the hardware, allowing the hardware more autonomy to perform write operations much more efficiently. For example, in some embodiments, firmware can allocate buffers to allow the hardware to read sufficient data from the existing virtual disk to write an entire stripe. This increased hardware automation can significantly improve the performance of OCE and similar operations.

In an aspect of some embodiments, performance of maintenance operations in general can also be improved by notifying the hardware of precise regions of the virtual disk affected by the maintenance operation at any given time. This can be helpful when performing many maintenance operations, when host IOs must be diverted to firmware (or some other storage) to await completion of the maintenance operation. By reserving only the portion of the virtual disk that is actually affected by the maintenance operation, certain embodiments can allow the hardware to continue to perform host IOs on portions of the virtual drive not affected by the maintenance operation at any given time, reducing the number of IOs that must be diverted. As used herein, the term "divert" is used to mean any operation by which a host IO is delayed from executing; in many cases, diverting a host IO comprises transmitting the host IO to firmware to manage until the host IO can be written safely and/or appropriately.

As used herein, the term "maintenance operation" means any operation performed on a virtual disk (often by RAID controller firmware) that requires prevention of IOs, other than IOs specifically performed as part of the maintenance operation, to some or all of the disk. This reservation against other IOs (e.g., host IOs) is often necessary to prevent multiple drive IOs, which can cause data corruption. Maintenance operations can include, without limitation, bad block management operations, OCE operations, RAID level migration operations, consistency check operations, copy-back operations, rebuild operations, etc., and/or any operations that can operate on near-consecutive stripes or rows, such stripes or rows affected at any given time by the maintenance operation can be isolated from stripes or rows unaffected at that time.

Figure 1B:
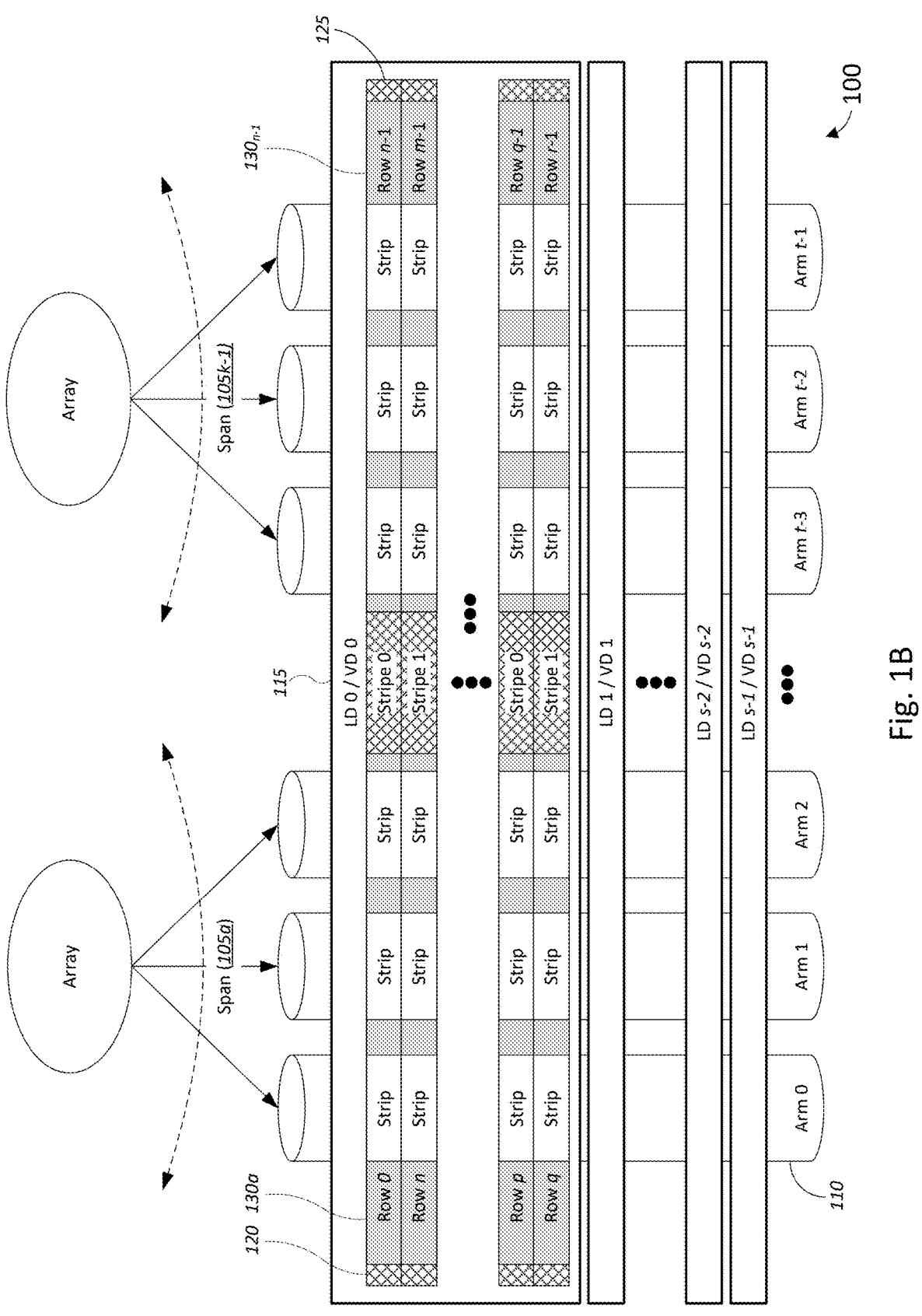
Figure 2:
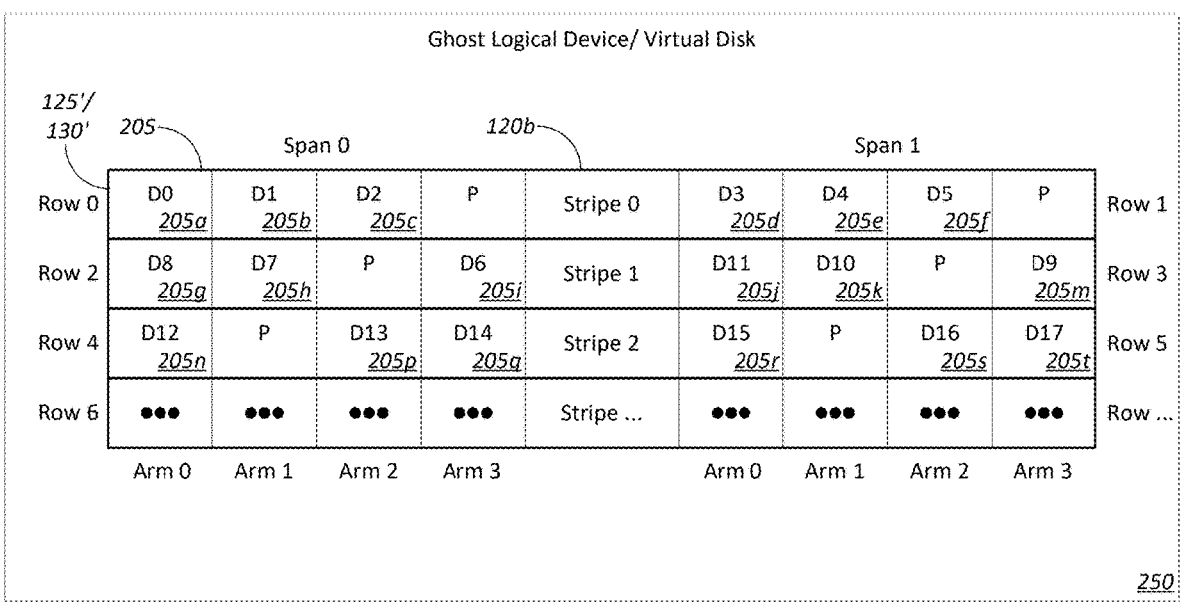

The concepts of stripes and rows can be understood by reference to FIGS. 1A, 1B, and 2. FIG. 1A illustrates a single span RAID array 100, while FIG. 1B illustrates a multiple-span RAID array 100'. The array 100 utilizes a single span 105 of physical disks 110, each of which is also referred to herein as an "arm" of the virtual disk. As illustrated on FIG. 1A, the array 100 is divided into a plurality of virtual disks 115. As illustrated by virtual disk 115a, a virtual disk 115 can include a plurality of stripes 120. Each stripe 120 includes a strip 125 from each arm 110 of the virtual disk 100. A "strip" therefore describes a unit of storage on a single physical disk (arm). In an aspect, each strip 125 is the same size. As used herein the term "logical block" (LBA) means the smallest amount of data that can be written or read in a single drive IO, and each LBA has a fixed size (e.g., 4 KiB). Each strip 125 generally is a fixed number of LBA, such that a strip 125 might be a multiple of the LBA size (e.g., 64 KiB, 128 KiB, 25 bKiB, etc.).

The multi-span array 100' of FIG. 1B is similar, except it includes multiple spans 105, each of which includes its own set of arms 110. In this case, a row 130 comprises the strips 125 from a single span 105, and the stripe 120 comprises the corresponding row 130 from each span 105. In some embodiments, all of the spans 105 are homogenous (e.g., each span 105 contains the same number of arms 110, the size of strips 125 in each span 105 is the same, etc.). In another aspect, a virtual disk 115 starts on a stripe boundary. Thus, when comparing the arrays 100 and 100', each stripe 115 in the single-span array 100 is the same as a row 130 in the multi-span array 110'.

FIG. 2 illustrates these concepts further in the context of OCE, which will be discussed in detail later. That figure shows a source virtual disk 200 and an expanded virtual disk 250. The term "ghost virtual disk" is also used herein to refer to the expanded virtual disk. The source virtual disk 200 is a layout of the virtual disk before any expansion, while the ghost virtual disk 250 is a layout of the virtual disk after expansion has been completed. As described in further detail below, some embodiments are configured to support both layouts simultaneously to enable the hardware to perform read IOs from the source virtual disk and write IOs to the ghost virtual disk.

In FIG. 2, the source virtual disk 200 comprises three full stripes 120 (Stripes 0-2) and a half stripe (Row 8) of labeled LBAs 205. Each stripe 120 comprises two rows 130; for example, Stripe 0 comprises Row 0 and Row 1. For the sake of simplicity, each row 130 comprises one strip 125, and each strip 125 comprises three LBAs 205. For example, the first row, 130a (Row 0) consists of a single strip 125a, and that strip 125a comprises two data LBAs 205 (D0 and D1), and a parity block (P). (A parity block does not store any unique data but instead stores data from which corrupted LBA can be reconstructed, which is employed in some, but not all RAID configurations.)

By contrast, in the ghost virtual disk 250, the same labeled LBAs 205 have been arranged into three stripes 120b (Stripe 0, Stripe 1, and Stripe 2). (A stripe 120b in the ghost virtual disk 250 is referred to herein as a "ghost stripe.") In this layout, each row 130b (and therefore strip 125b, in the illustrated embodiment) comprises three data LBAs 205 and a parity block. For instance, Row 0 comprises LBAs 205a-c (D0, D1, and D2), in addition to a parity block P, and each stripe (e.g., Stripe 0) 120b therefore contains six LBAs (D0-D5) and parity blocks P. As can be seen, the ghost layout 250 has added to the capacity of the virtual disk; given that each arm 110 comprises a physical disk that can hold a fixed number of strips 125, reducing the number of rows 130 by one reduces the number of utilized strips 125 by one per arm, effectively expanding the capacity of the virtual disk by recovering one strip of capacity per arm. As described in detail below, some embodiments provide techniques to make this OCE process significantly more efficient by enabling the hardware to read and write data to fill an entire stripe 120 of the ghost virtual disk 250 at a time, rather than requiring the firmware to schedule reads and writes more granularly.

Thus, referring to FIGS. 1A, 1B, and 2, a stripe 120 represents all the LBAs 205 across one strip 125 of each arm 110 of every span 105 of a virtual disk 100. The stripe size of a virtual disk (in LBA) can be represented using the following expression:

$$S_{stripe} = \frac{S_{strip} * N_{arms} * N_{spans}}{S_{LBA}}$$

where $S_{stripe}$ is the stripe size of the virtual disk, $S_{strip}$ is the strip size of the virtual disk, $N_{arms}$ is the number of arms per span, $N_{spans}$ is the number of spans in the virtual disk, and $S_{LBA}$ is the number of LBAs per stripe of one data arm.

In case of a single-spanned virtual disk (such as that depicted in FIG. 1A), the stripe size is equivalent to the row size, because there is only one span. (Note that neither the row size nor the stripe size includes parity blocks, and that not every RAID configuration employs parity blocks). Hence, the stripe size of the exemplary source drive 200 of FIG. 2 is 4 LBA, while the stripe size of the exemplary ghost disk in FIG. 2 is 6 LBA.

Figure 3:
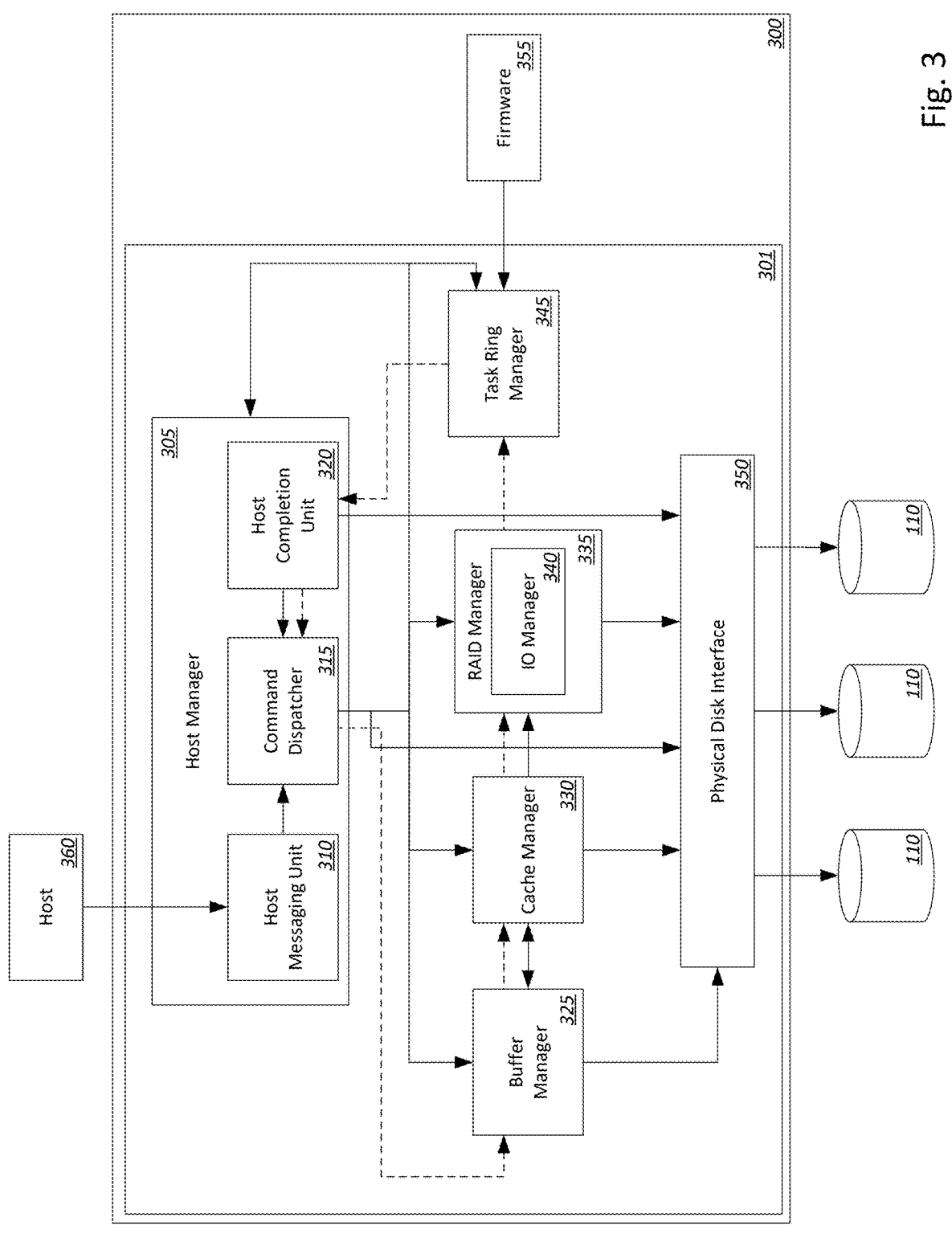
FIG. 3 illustrates a device for managing a virtual disk in accordance with some embodiments.

FIG. 3 illustrates an exemplary architecture for a device 300 (e.g., a RAID controller) that can be used in various embodiments. In an aspect, the device comprises a set of hardware circuitry 301 (also referred to herein as simply "hardware"). This hardware circuitry 301 comprises several hardware components, each of which is encoded with circuitry to cause it to perform, inter alia, the functions and procedures disclosed herein. The hardware circuitry 301 can comprise, without limitation, a host manager 305. The host manager 305 includes a host messaging unit (HMU) 310, a command dispatcher unit (CDU) 315, and a host completion unit (HCU) 320. The hardware circuitry 301 further comprises, in some embodiments, a buffer manager 325 and/or a cache manager 330. The hardware circuitry 301 can further comprise a RAID manager 335, which can include an IO manager 340, as well as a task ring manager 345, and/or a physical disk interface 355.

It should be noted that the device 300 illustrated in FIG. 3 is merely exemplary in nature, and many embodiments can comprise more, fewer, or different hardware components. In certain embodiments, each component of the hardware circuitry 301 performs discrete functions or tasks. In other embodiments, the hardware circuitry 301 can be considered to collectively perform such tasks, and/or the same or different components might perform other discrete tasks. Hence, embodiments are not limited to the structure disclosed in FIG. 3 unless explicitly stated; moreover, to the extent that an embodiment states that "hardware circuitry" itself performs a particular task, such an embodiment does not require any particular hardware component to perform that task.

In some embodiments, the device further comprises firmware 355, which, unlike the hardware circuitry 301, often includes instructions that can be executed by a processor, such as a microprocessor. The firmware 355 might generally comprise instructions stored on a persistent form of data storage, such as a programmable read only memory (PROM) or one of several derivatives, nonvolatile RAM, programmable logic devices (PLD), field programmable gate arrays (FPGA) and/or the like. The firmware 355 can be more adaptable and/or updateable (in some cases) than the hardware circuitry 301 and can perform more complex tasks. The cost of this complexity, however, is speed. Each component of hardware circuitry 301 generally is optimized to perform one (or a few) relatively simple tasks, but to do so very quickly. In contrast, as described herein, some embodiments execute firmware instructions to perform more complex tasks, like storing diverted host IOs, calculating and allocating buffer segments, and performing maintenance tasks. In each of these cases, the firmware 355 is providing instructions to the hardware circuitry 301. But, as noted above, some of the efficiency gains enjoyed by various embodiments can result from requiring less of the firmware 355 and/or enabling the hardware circuitry 301 to perform tasks without the throttling inherent to the use of firmware 355 is performing the tasks.

In the illustrated embodiment, HMU 310 provides communication with a host 360. The CDU 315 receives IOs, e.g. from the HMU 310, the firmware 355, etc. and, based on those requests, dispatches IO commands for execution. As used herein, the term "IO" is used generally to mean any input-output operation on a virtual disk, and/or a request or command to perform such an operation. Such operations can include, without limitation read operations and write operations. As described further below, specific types of IO are mentioned where appropriate. The actual read or write operations on the physical disks of the virtual disk are referred to as "drive IOs." Drive IOs are the only input-output operations actually executed on the physical media (e.g., reading or writing data to disk); all other types of IOs are actually requests or commands (at various levels of abstraction) to perform one or more drive Ios. Thus, the term "IO," when used without modifiers, can refer to both the actual drive IO and/or any other IO (e.g., requests or commands to perform actions that will result in one or more drive Ios).

For instance, requests from a host for data to be read from or written to the virtual drive are referred to as "host IOs." As used herein, the term "host" refers to any device or system (which can be hardware, software, etc.) outside the hardware 301 and firmware 355 of the device managing the RAID (e.g., a RAID controller), that provides requests or commands for IOs. Examples of hosts can include the operating system of a computer using a virtual disk for storage, a storage area network (SAN) device, any other sort of networking device, and/or intermediary devices between any of these and the device (e.g., a RAID controller) performing the procedures described herein. A host IO, in some embodiments, comprises a request to read or write data to the virtual disk; this requested data might be of various sizes, and often will need to be divided by the device for processing and/or for more efficient internal communication.

Thus, as described further below, the device itself can employ "accelerated IOs," (ACIO) which are internal communications within the device. The ACIOs can include parent ACIOs. One type of parent ACIO is generated by a component of the hardware 301 (e.g., CDU 315) after the hardware 301 has received a host IO and determined that it should be executed at that time (rather than diverted). The host IO might have been received directly from the host or might have been diverted earlier and then resubmitted for execution, e.g., by the firmware 355. The parent ACIO, which is then routed internally for execution on the virtual disk, as described in detail below. In some cases, the host IO might comprise a request for sufficient data reads/writes that it can be divided into different IOs (e.g., for parallel execution); in this case, the parent ACIO might be used to generate one or more child ACIOs, which are more granular requests for particular read/write operations on the virtual drive, and which can be performed by different threads in parallel, in accordance with some embodiments. In other cases, the parent ACIO is not used to generate any child IOs, and the parent ACIO can itself serve to accomplish the full request of the host IO. The parent ACIO (or, in appropriate cases the child ACIOs generated from the parent ACIO) then can be used to generate the drive IOs, which actually perform the read/write operations on the media of each physical disk. In some cases, a parent ACIO or child ACIO will be divided into a plurality of drive IOs, if the parent or child ACIO, for example, requires reads/writes to multiple arms, because each drive IO might be directed to a single arm (physical disk).

The HCU 320 is the endpoint for host IOs and receives notice, e.g., from the firmware 355 or from other hardware 301 when host IOs have been completed. In some embodiments, the buffer manager 325 handles interactions with buffer memory. In some embodiments, in which caching is employed for a virtual disk, the cache manager 330 handles the caching of IOs during prior to execution. The RAID manager 335 handles most interactions between the device 300 and the physical disks (arms) 110. In particular embodiments, the RAID manager 335 comprises the IO manager 340, which handles low-level interaction with the physical disks 110, including the creation of drive IOs to instruct the physical disks 110 to execute the actual reads and writes on the physical media of the disks 110. This interaction is provided through the physical disk interface 355, which provides direct, low-level access to communicate drive-level instructions, such as drive IOs, to the physical disks. The physical disk interface 355 can comprise one or more network interface cards or other communication cards or ports to communicate with the physical disks 110 over a network such as a storage area network (SAN), serial attached small computer system interface (serial attached SCSI or SAS), connections, fibre channel connections, and/ or the like.

The task ring manager 345 manages a task ring, which provides high speed communications between the various components of the device 300, including the firmware 355 and the various components of the hardware 301. In a particular embodiment, the task ring carries messages (task ring messages or TRM) that are local to the controller 300 and are used for a variety of purposes while the controller 300 is operating. In an aspect, some TRMs can have an LMID field or frame that can hold an ACIO and/or a reference to an ACIO. In another aspect, each ACIO is transmitted in its own TRM. The transmission of ACIOs by TRM provides for enhanced performance in the processing of IOs. For example, a host IO generally is transmitted using a standard message passing interface (MPI) message, which provides relatively slow communications compared to the task ring. This MPI message can be received by the hardware 301 (e.g., the CDU 315), which can create a new parent ACIO from the host IO, if the hardware 301 determines that the host IO should be executed; if not, the hardware 301 (or a component thereof) can copy the data from the host IO into an LMID for diversion to the firmware 455 over the task ring. As noted above, in some cases, the CDU 315 (or another component) might generate child IOs from the parent IO, in which the IO data and other parameters from the parent ACIO might be shared and/or divided among the child ACIOs, for example as described in further detail below. The parent ACIO and/or child ACIOs can then be transmitted to other components for execution, e.g., as described below.

Figure 4:
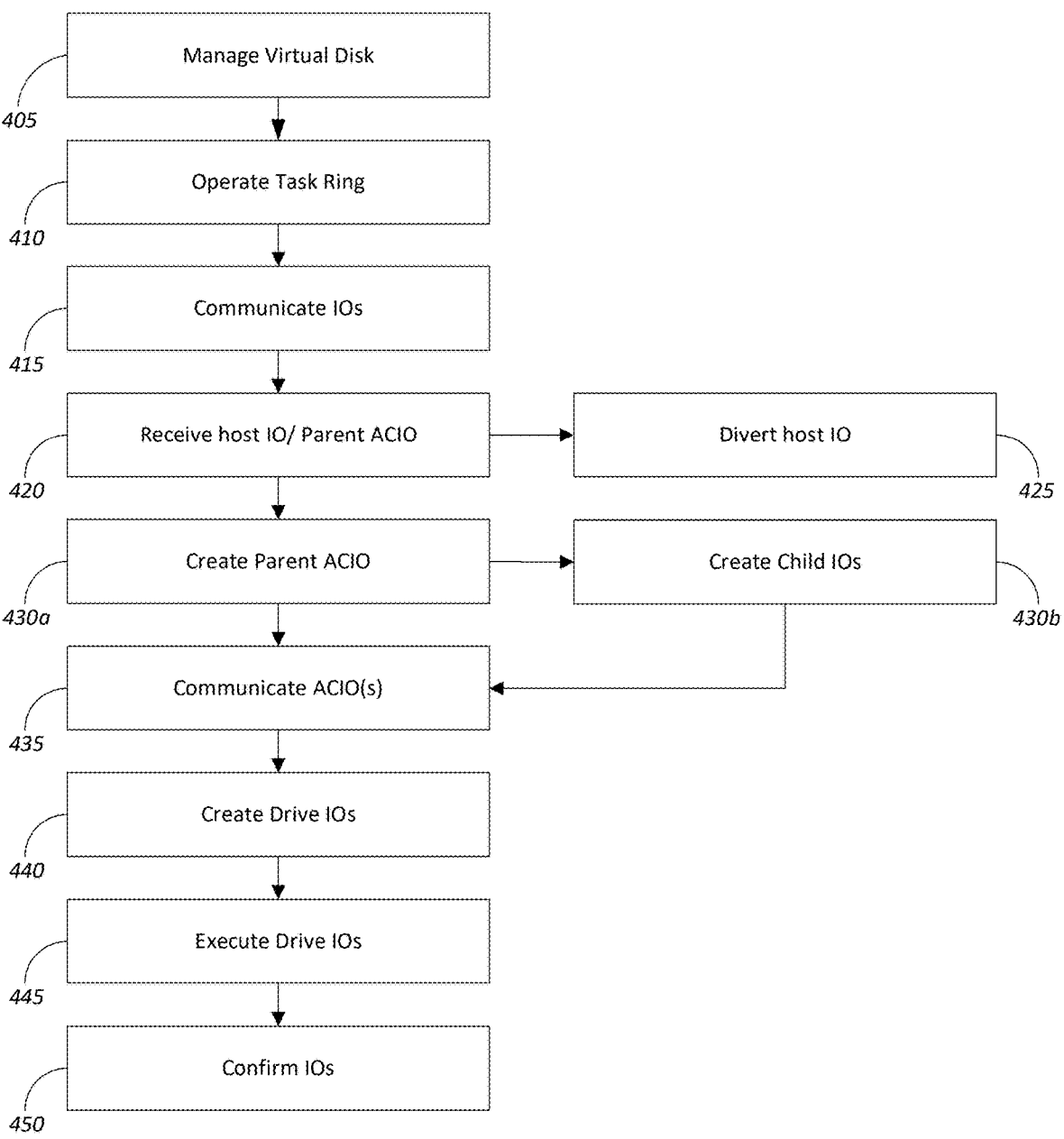
FIG. 4 illustrates a method for managing a virtual disk in accordance with some embodiments.

FIG. 4 illustrates a method 400 showing components of the exemplary device 300 above in one mode of operation. The method 400 comprises, at block 405, managing a virtual disk. As noted above, a virtual disk can comprise one or more spans, each of which can comprise one or more arms; each arm might comprise a physical disk. Also as noted above, the virtual disk can comprise a plurality of stripes, each of which can comprise a row from each of the one or more spans; each row of a span can comprise a strip from each of the arms in the span, each of the strips comprising one or more, such that the plurality of LBA comprising one or more LBA from each of the arms of the span.

Managing a virtual disk, therefore, can comprise many different operations, including without limitation, reading and/or writing data to the physical disks that serve as arms for the virtual disk, organizing the physical disks into arms, arms into one or more spans, and/or spans into one or more virtual disks, maintaining and/or updating such organization (e.g., OCE operations or RAID level migration (RLM) operations), performing maintenance operations (or portions thereof) on a virtual disk, and/or the like. In some respects, these different operations might be divided among various components of a device 300; as used herein, "managing" a virtual disk means performing all or part of any such operations. As such, different components of the device can be considered to be managing a virtual disk, and the device itself can be considered to be managing a virtual disk.

At block 410, the method 400 can comprise operating a task ring for communicating messages (TRMs) between the plurality of components. While some of the components do include various connections (as illustrated by the solid arrows), the task ring (indicated by dashed arrows) provides a high-speed communication ring that connects the task ring manager 345, the HCU 320, the CDU 315, the buffer manager 325, the cache manager 330, and the RAID manager 335. The task ring manager 345 also includes communication with the firmware 355. In particular, the task ring provides a way for components to communicate IOs as needed. For example, if a host IO needs to be diverted or resubmitted, the host IO can be communicated using the task ring (e.g., back and forth from CDU 315 and the firmware 355); as noted above, in some embodiments, the host IO can be copied into an LMID for this transmission.

Thus, the method 400 includes communicating a plurality of host IOs via the task ring (block 415). As disclosed further below, some of the host IOs can be diverted to the firmware 355 for later execution (e.g., after performance of a maintenance operation), while some of the host IOs might be eligible to be performed immediately, depending on the maintenance status of the virtual disk. Thus when a host IO is received in the hardware circuitry 301 (block 420), the hardware 301 determines whether the IO should be diverted or executed without diversion. The watermarking technique described below is one example of how the hardware 301 can determine whether to divert the IO, although various embodiments can use different techniques.

In some embodiments, the hardware 301 might be configured not to divert any IOs (of whatever nature) submitted by the firmware 355. For example, the firmware 355, in some embodiments, is aware of (and, in fact control of) the maintenance operation, and IOs submitted by the firmware 355 often will be IOs that are part of the maintenance operation. In some cases, the firmware 355 might set a field in the LMID for an IO to indicate that the IO is part of the maintenance operation. In some cases, even if no such field is set, the hardware 301 will not divert the IO because the firmware 355 is presumed to be able to determine whether the IO (even if the IO is a resubmitted host IO and/or is not part of the maintenance operation) will not cause data corruption or otherwise interfere with the maintenance operation.

If the device 300 (and/or a component thereof, such as the hardware 301, the CDU 315, etc.) determines that the IO should be diverted, the hardware 301 diverts the IO (block 425). In some embodiments, the hardware 301 diverts the IO to the firmware, e.g., with an LMID comprising the host IO, which handles the storage and resubmission of the IO for later execution, e.g., as described in further detail below. If the hardware 301 determines that the IO can be performed without diversion, the method 400 can include generating (e.g., creating) a parent ACIO from the host IO (block 430*a*) and/or, if necessary, generating (e.g., creating) one or more child ACIOs from the parent ACIO (block 430*b*). (As noted above, in some cases, the device 300 might not create any child ACIOs and might instead pass the parent ACIO to the next step in the process. In an aspect, the child IOs each can be performed by a different IO thread in the IO manager 340, allowing for parallel execution of different parts of the host IO/parent IO. In some embodiments the CDU 315 receives these host/parent IOs and generates the child IOs, although different embodiments can employ different hardware 301 and/or logic to perform these operations.

The parent ACIO or child ACIOs can then be communicated (block 435), e.g., via the task ring and/or directly, to be performed on the virtual disk. (From this point, the method 400 proceeds in similar ways whether with a parent ACIO or child ACIOs, so the general term ACIO will be used to indicate that similarity.) In some cases, the ACIO(s) can be communicated to the IO manager 340, while in other embodiments, the ACIO(s) can be communicated first to the cache manager 330, which then can forward the ACIO(s) to the IO manager 340 if necessary. Once again, however, embodiments do not require the performance of these operations by any specific component. In some embodiments, these ACIO(s) then can be used (e.g., by the IO manager 340) to generate a plurality of drive IOs (block 440), each of which, as noted above, might send instructions to a different arm (physical disk) of the virtual disk. These drive IOs then can be executed on the virtual disk (block 445), e.g., by communications from the device 300 (and/or a specific component thereof, like the IO manager 340, to name one example) transported via the physical disk interface 350 to the relevant physical disk(s) 160 on which each drive IO should be performed. In embodiments that employ caching, the parent ACIO or child ACIOs can perform the read or write directly on the cache and return, instead of executing drive IO(s) on the physical disks.

At block 450, the IOs might be confirmed. In some embodiments, for example, the IO manager 340 and/or cache manager 330 might receive confirmation of the reads/writes from the physical disks and/or might transmit confirmation messages (e.g., via LMID), e.g., to the firmware 355, HCU 320, etc., to confirm that the host IO has been successfully executed.

This basic process 400 can be used (and/or modified) in various ways throughout various embodiments, as described in further detail below.

Watermarked Maintenance Regions

Figure 5:
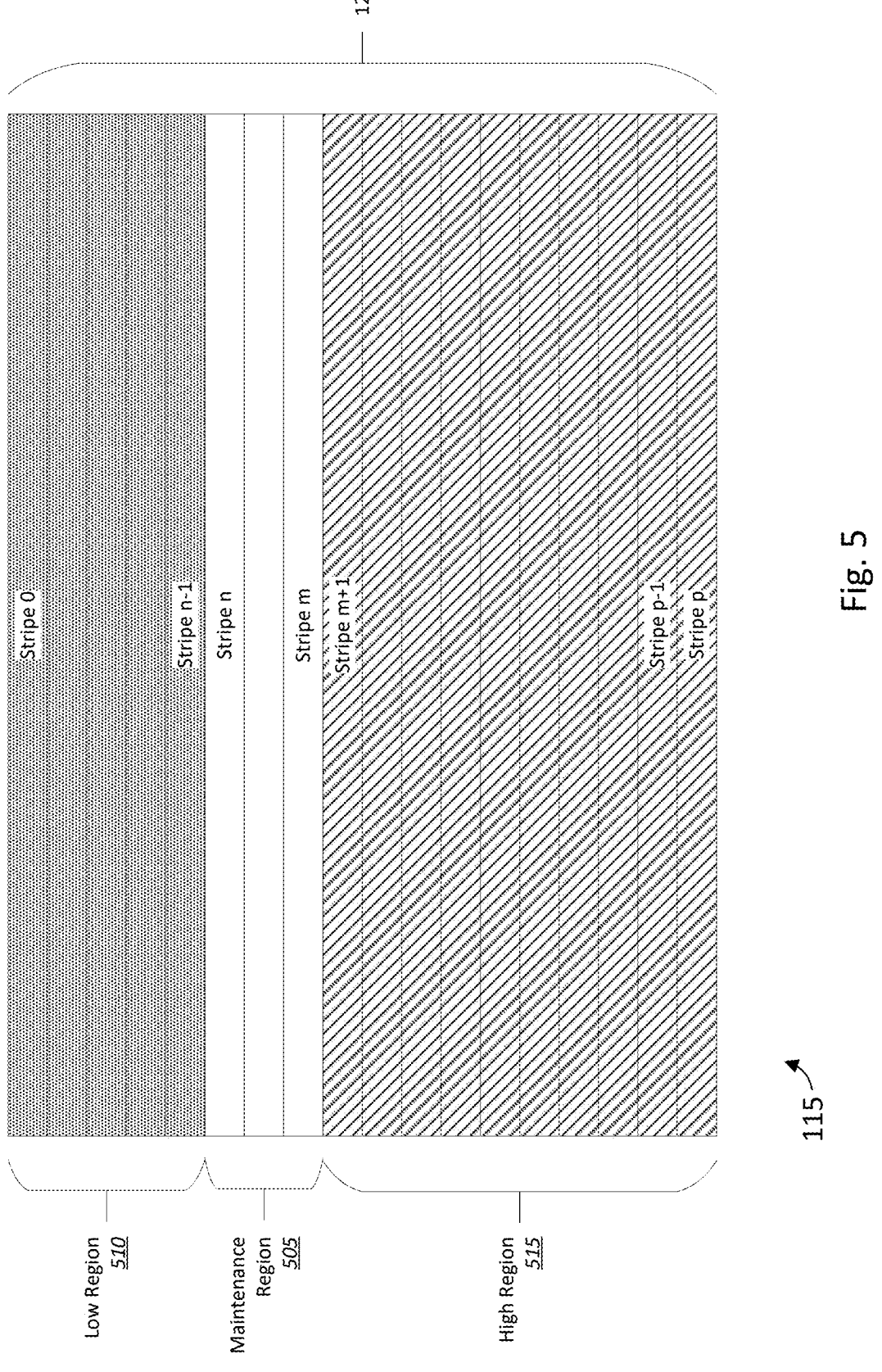

As noted above, one benefit of some embodiments is that maintenance operations can be performed on a virtual disk without requiring the entire virtual disk to be made unavailable for host IOs. To illustrate this concept, FIG. 5 provides a simplified illustration of a virtual disk 155, which include several stripes of data. Stripe n through Stripe m are part of the "maintenance region" of the virtual disk, which this document uses to refer to a particular set of (usually but not necessarily contiguous) on which the firmware 355 is actively performing maintenance operations (or for which maintenance operations are imminent). Stripe n, the lowest-numbered stripe in the maintenance region 505, is referred to as the "low stripe," and stripe m, the highest-numbered stripe in the maintenance region 505, is referred to herein as the "high stripe." Different embodiments employ various techniques to determine the low stripe and the high stripe, and some of those techniques are discussed below in further detail.

Stripe 0 to stripe n, are part of what is referred to as the "low region" 510, which comprises stripes on which the maintenance operation has been completed, and stripe m+1 to stripe p are part of the "high region" 515, which comprises stripes on which the maintenance operation has not yet been performed (and/or will not be performed imminently). Disk maintenance operations are assumed to proceed throughout the virtual disk from Stripe 0 to Stripe P, such that the maintenance region 505 also progressively moves from lower to higher stripes as the maintenance operation progresses.

(It should be noted that the terms "high region," "low region," high stripe" and "low stripe" are chosen arbitrarily within the context of this disclosure. Neither these naming conventions nor the ordering of the stripes affects the scope of the embodiments. For example, in a system in which maintenance operations proceeded from the highest stripe number to the lowest stripe number, the naming conventions would be reversed, such that the high region 515 is the region comprising stripes on which the maintenance operation has been completed and the low region 510 comprises stripes that have not yet been subject to the maintenance operations. In any case, the principles discussed herein apply equally.)

While executing drive IOs on stripes in the maintenance region 505 carries a high risk of causing data corruption, drive IOs on stripes in the low and high regions 510, 515, respectively, are subject to little (if any) risk of corruption greater than the baseline risk. Certain embodiments can allow the hardware circuitry 301 to determine whether a particular host IO will require any drive IOs to be performed on stripes in the maintenance region 505, and if so, divert those host IOs to be performed after the stripes are no longer in the maintenance region. But it will also allow the hardware 301 to execute, without diverting, host IOs that would not create drive IOs on stripes on the maintenance region. Given that the maintenance region 505 might be as few as 1% or fewer of the stripes at any given time, this allows execution of up to or over 99% of the host IOs to be executed without being diverted, increasing disk performance during the maintenance operation significantly.

This document refers to this technique as "watermarking" the maintenance region 505 of the virtual disk, and it can provide several benefits. First, without the watermarking technique, RAID controllers must generally divert all IOs to the firmware 355, which, as noted, has a significant performance impact. The firmware 355 generally can perform maintenance operations on only a few stripes or rows at a time, which pales in comparison to the total number of stripes/rows in a virtual disk. While there can be large regions (e.g., the low region 510 and the high region 515) in which IOs can be issued directly, many solutions require the diversion of all IOs to the firmware 355, which decides when each IO can be performed. This adds to the turnaround time of all IOs and degrades the IO performance of the virtual disk generally. In contrast, according to certain embodiments, the IOs on stripes outside the maintenance regions can execute in hardware and do not suffer from any performance impact, such that these host IOs do not need to be diverted.

Moreover, in an operation like OCE (described in further detail below) where LBAs are moved from a source virtual disk to a ghost virtual disk, the watermarking technique can inform the hardware 301 of where each non-diverted host IO should be performed. If the host IO is directed to one or more stripes in the low region 510, the hardware can determine that the drive IO(s) resulting from that host IO will be executed on stripes that already have been expanded, so those drive IOs should be written to the ghost virtual disk. In contrast, if the host IO is directed to stripe(s) in the high region 515, the resulting drive IOs will be written to stripes that have not yet been expanded, and those drive IOs should be written to the source virtual disk.

Further, a greater number of IOs diverted to the firmware 355 requires correspondingly more processing in the firmware 355 between cycles of a maintenance operation to resubmit those IOs back to the hardware 301 for execution. As explained in further detail below, some operations (e.g., OCE operations in some embodiments) might be performed in cycles, which allows the processing of the virtual disk in phases. A cycle can be considered, in some embodiments, to be one iteration, from start to completion, of a maintenance operation on a set of one or more stripes or rows, such as an expansion of stripes/rows in parallel during an OCE operation. In an aspect, many examples of cycles can include two phases: a read phase and a write phase (although some embodiments can employ more or fewer phases). In some embodiments, for example, a cycle of an OCE operation can involve a read phase during which one or more read operations are performed on the source virtual disk to read a specified number of LBAs from the source disk, and a write phase, during which one or more write operations write those same LBAs to the ghost virtual disk. Examples of such cycles are described in more detail below.

As noted, a typical maintenance operation without the techniques described herein will divert an excessive number of host IOs, which must be resubmitted at some point. If the firmware 355 chooses to resubmit higher number of IOs per cycle, however, the maintenance operation gets delayed. Conversely, if the firmware 355 chooses to resubmit fewer number of IOs per cycle, IO completion time is increased. Because the watermarking technique of certain embodiments requires only the IOs overlapping with the watermark region to be diverted to the firmware 355, the number of IOs under a truly random workload would be usually orders of magnitude fewer than without the use of such embodiments.

Generally, the hardware 301 has no information of the type of operation the firmware 355 is running on a virtual disk. Thus, the hardware 301 cannot decide in an operation agnostic way how to handle an IO that is inside the range of the impacted region. By contrast, as explained below, in various embodiments, the hardware 301 is provided with precise information about the maintenance region and can determine independently, without the knowledge of any specific firmware operation, how to route the host IOs.

A skilled artisan will recognize that the diversion and resubmission of each host IO involves at least two messages to be transferred between the hardware 301 and the firmware 355. In many cases, the submission and receive queues of each processor core are limited, and it may be desirable to reduce unnecessary traffic on them. In some cases, if the firmware 355 cannot consume all the host IOs at the rate the hardware 301 diverts them, the system can get stuck. As noted above, certain embodiments can substantially reduce host IO diversions and resubmissions between the hardware 301 and the firmware 355 reduce this traffic by executing, rather than diverting, all host IOs that affect only stripes outside the maintenance region 505, which, as noted, can be a significant proportion of all host IOs.

The number of task ring messages the firmware 355 can submit to the hardware 301 typically is limited by the number of credits the firmware 355 has for the destination the hardware 301. Typically, the credits range within 8 to 16. If the firmware 355 has to submit more IOs than that, the firmware 355 has to hold them in a queue and keep polling to ensure that the hardware 301 has consumed some of the task ring messages submitted in the earlier cycles and the firmware 355 has credits available to submit new task ring messages to hardware 301. This can have a severe impact on host IO performance. Because some embodiments allow most of the host IOs to be executed without diversion, the number of resubmissions from the firmware 355 to hardware 301 is greatly reduced. If the diverts are within the credit limit (which is highly probable in the case of truly random or sequential IOs), there will be no lag due to lack of credits.

Certain embodiments can enhance bad block management operations, in which bad blocks are detected, isolated, and/or repaired, if possible. Some controllers provide a bad block bitmap in the hardware 301, which can operate like a hash table to detect IOs which have the probability of hitting bad blocks on the physical disks. Generally, however, these bitmaps are limited in size and must be shared by all virtual disks in the system; in an environment with many virtual disks, even if there are clustered bad blocks localized to a few stripes on a specific virtual disk, there is no way to identify those bad blocks or clusters uniquely and reduce the number of false bad block detections on other virtual disks. In certain embodiments, however, the firmware 355 can isolate contiguous (or proximal) strips of a virtual disk having clusters of bad blocks and watermark that region as a maintenance region rather than using the bad block bitmap. This will reduce the false detection for other virtual disks and allow more precise bad block maintenance operations.

In both OCE and RAID level migration (RLM) operations (in which the RAID level of a virtual disk is changed), a controller typically will have to divert all host IOs to the firmware 355 because the hardware 301 does not have the information and capability to route host IOs for the virtual disk by checking the region of the virtual disk being migrated. As explained in detail below, various embodiments can offer additional advantages for OCE operations, and this applies for RLM operations as well. In such embodiments, the low region by definition comprises stripes on which the expansion or migration already has been performed (i.e., stripes in the ghost drive layout, in the case of OCE), while stripes in the high region comprise stripes on which expansion or migration has not yet occurred (i.e., stripes in the source drive layout, in the case of OCE). As such, if the hardware 301 is aware of the stripes that define the maintenance regions (i.e., Stripe n—the low stripe—and Stripe M—the high stripe) the hardware 301 knows whether to perform a particular drive IO on the source drive or the ghost drive. As such, the vast majority of IOs can be performed during the OCE (or RLM) operation, rather than being diverted until the operation is complete and will be written to the proper layout without requiring later adjustment or rewriting.

Figure 7:
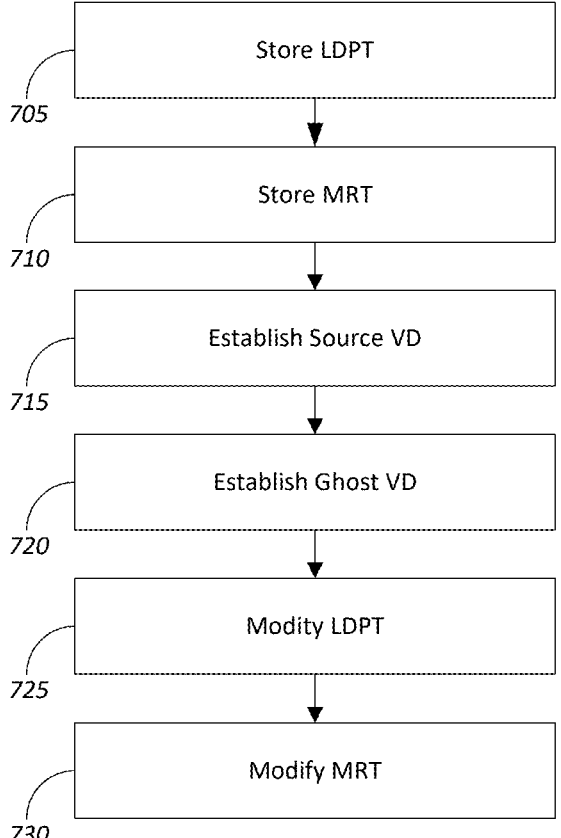
FIG. 7 illustrates a method of preparing a virtual disk for a maintenance operation in accordance with some embodiments.

To highlight some aspects of the watermarking technique of certain embodiments, FIG. 6 illustrates a method of performing a maintenance operation on a virtual disk. In some embodiments, the method 600 comprises initiating a maintenance operation (block 605). Initiating a maintenance operation can comprise one or more operations to prepare the virtual disk (and the controller) for the maintenance operation. FIG. 7 illustrates a method 700 comprising some of those operations.

For example, certain embodiments employ the use of a virtual disk property table (also referred to as a virtual disk property table (VDPT)), and the method 700 can include storing the VDPT (block 705). The system might also use an additional table, the maintenance region table (MRT), and the method 700 can also include storing the MRT (block 710). In an aspect, the MRT stores information defining the location of the current maintenance region during maintenance operations. In some embodiments, the VDPT and MRT are stored and maintained by the CDU 315.

The method 700 might also include establishing a source virtual disk (block 715) and/or establishing a ghost virtual disk (block 720), for instance when the maintenance operation involves an OCE operation and/or an RLT operation. Establishing the source virtual disk and the ghost virtual disk might comprise modifying the VDPT to identify the original virtual disk as the source virtual disk, to add a VDPT element corresponding to the ghost virtual disk, and/or modifying the VDPT to identify the source virtual disk as a peer of the ghost virtual disk (block 725). Some or all of these operations can be accomplished before the maintenance operation actually begins.

In some embodiments, the VDPT includes a VDPT element for each virtual disk configured in the system. For instance, the VDPT might comprise an VDPT element corresponding to the virtual disk. In some embodiments, the VDPT stores a device handle for every virtual disk in the system; this device handle can be a unique identifier of each virtual disk. Modifying the VDPT can include adding and/or modifying one or more VDPT elements to prepare for the OCE operation.

In an OCE operation, for example, firmware 355 might modify the VDPT to add an element for the ghost virtual disk and/or configure an element with the ghost virtual disk device handle, along with relevant properties like RAID level, number of data arms, total number of arms, etc. The firmware 355 might also populate an array information table (e.g., in the RAID manager), which contains the physical drive device handles for each LD, populated in a sequential manner, with the drive information for the ghost LD, including the online or offline state of the drives of the source LD. Though the source and the ghost LDs share the original set of drives, the layout is defined distinctly in the table so that the RAID Manager can process IOs (for example, as described below) for each virtual disk independently. Both source and ghost LDs should be available (even if in fully degraded state) to continue the OCE operation. So modifying the VDPT can also include updating the VDPT to reflect any change in state of the source and ghost LDs while the OCE operation is in progress is also updated by firmware 355 to reflect the state of the source and ghost LDs. The firmware 355 might also store the information of the ghost virtual disk in persistent memory to resume the process in case of an interruption. Once OCE completes, firmware 355 might remove the ghost virtual disk element and update the source VDPT element to reflect the change in the virtual disk configuration. The firmware 355 might also trigger a rescan of the virtual disk to expose the new capacity to the host.

In an aspect, the VDPT can include additional fields that identify the source and the ghost virtual disks as peer devices (this is of particular use in OCE or RLM operations). To do so, the VDPT can include a PeerLD field (which might be 16 bits but can be of any appropriate size and can have any appropriate name). In some embodiments, the default value of this field is set to 0 (invalid device handle). The firmware 355 will update this field with the source virtual disk device handle after configuring the ghost virtual disk in the CDU 315. The PeerLD field for the source virtual disk will be updated with the ghost virtual disk device handle. Note that for maintenance operations that do not require the use of a ghost virtual disk, the PeerLD field might be set to have the source device handle (since there is no ghost virtual disk).

In some embodiments, each VDPT element might comprise a field to indicate whether the corresponding virtual disk is undergoing a maintenance operation. Merely by way of example, in some embodiments, a MaintenanceRegionEnabled field is also included in the VDPT. This field, which might be a single bit, can be set to inform the hardware 301 that a maintenance region is enabled on a virtual disk. If this bit is set, the hardware 301 (e.g., CDU 315) will look to the MRT to find the boundaries of the maintenance region. In an aspect, then, modifying the VDPT (block 725) can also include modifying the VDPT to indicate the existence of a maintenance region on the virtual disk.

In an aspect, the method 700 can further comprise modifying the MRT to identify the high stripe and the low stripe for the maintenance operation (or, in many cases, for the current cycle of the maintenance operation) (block 730). For example, the MRT might have entries for each virtual disk configured in the system (and/or entries for merely the virtual disks currently subject to a maintenance operation. Each entry might include at least two fields: a LowStripe field, which the firmware 355 sets to indicate the lowest stripe (e.g., Stripe n as illustrated on FIG. 5) and a HighStripe field to indicate the highest stripe in the maintenance region (e.g., Stripe m as illustrated on FIG. 5). In some embodiments, each field can be a 64-bit field, although this is not required. In some cases, the MRT might be configured to hold LowStripe and HighStripe fields for every virtual disk in the system. In such cases, each VDPT entry field to indicate an index of an MRT element corresponding to the virtual disk reference by that entry. For example, the VDPT might include a MRTIndex field for each configured virtual disk; that field can identify the location in the MRT of the LowStripe and HighStripe fields for that virtual disk. As the maintenance region moves through the stripes of the virtual disk on successive cycles, the firmware 355 can update the MRT table accordingly.

In operation, the hardware 301 will divert the host IOs with the stripe numbers ranging from LowStripe to HighStripe to the firmware 355. The firmware 355 will hold these IOs until the completion of the current cycle of the maintenance operation and resubmit them to be executed on to the source or ghost virtual disk depending on the IO stripe numbers. As noted above in the context of FIG. 5 above, any IO to be performed on a stripe in the low region will be written to the source virtual disk. The firmware 355 will set MaintenanceRegionEnabled for the ghost and/or source virtual disks in the VDPT to enable the region based divert checks in the hardware 301. If the maintenance operation is a multi-cycle operation (e.g., an OCE, RLM, etc.), the maintenance region generally will shift with each consecutive cycle. The firmware 355 might identify/calculate new low and high stripes (e.g., as discussed below) and use register writes to update the LowStripe and HighStripe fields between each maintenance operation cycle (when no firmware 355 IOs for the maintenance operation are outstanding) to reflect the new maintenance region boundaries.

Returning to FIG. 6, the method 600 might comprise determining that a maintenance operation will affect one or more stripes of a virtual disk (block 610). This determination can take many forms. Merely by way of example, as noted above, this determination can involve the hardware 301 (e.g., the CDU 315) accessing the VDPT entry for that virtual disk. If the MaintenanceRegionEnabled bit is set, the hardware 301 can determine that a maintenance operation will affect one or more stripes of that virtual disk.

In some embodiments, the method 600 comprises identifying a low stripe of the maintenance region (block 615) and identifying the high stripe of the maintenance region (block 620). As noted, the designation of the low stripe and the high stripe can be based on the lowest and highest stripes, respectively, that will be affected by the maintenance operation, and the identification of this stripe can be done in different ways. To take a non-limiting example, the hardware 301 (e.g., CDU 315) can access the MRT entry for the virtual disk and identify the low stripe from the LowStripe field and the high stripe from the HighStripe field. The firmware 355 can determine or calculate the low stripe and the high stripe in several different ways. Generally, the calculation of the low stripe is trivial because the low stripe is whatever stripe the current cycle of the maintenance operation begins with.

Calculation of the high stripe can be somewhat more involved. For example, in operations like OCE and RLM, there is a possible issue of overlapping stripes, so the high stripe might not be the highest stripe number the firmware 355 is expanding. For instance, a non-diverted host IO might be directed to the stripe immediately above the high stripe in the current cycle; this IO might be delayed for some reason. Since the firmware 355 cannot wait for all outstanding host IOs to complete before starting a new cycle, when the firmware 355 initiates the next cycle, the low stripe could be the same as (or less than) the stripe with the delayed host IO; this presents the possibility that the delayed host IO and the maintenance operation IO might be directed at the same stripe, which can result in data corruption. To handle this issue, the firmware 355 might calculate the possible overlap region with an IO above the highest stripe the current cycle will affect and set the HighStripe to a stripe which renders IO overlap impossible. The firmware 355 is aware of the timeout on host IOs. If this value is 60 seconds, for example, the firmware 355 can rely on this value to ensure no host IO would be delayed beyond that amount of time. Depending on the stripe size of the virtual disk and the throughput of the underlying drive medium, the firmware 355 can time the initial few cycles of the maintenance operation and calculate how many stripes it can process in 60 seconds. The firmware 355 thus might add this number of stripes to the highest stripe to be operated on in the current cycle and determine the high stripe according to that calculation. For instance, in the example of FIG. 5, if the firmware 355 plans to perform maintenance on strips n through m−1 during the current cycle and estimates that it could complete one stripe in the host IO timeout period, it would add one stripe to m−1 to determine that the high stripe should be m.

In some embodiments, the method 600 can include defining a maintenance region based on the high stripe and/or the low stripe (block 625). If the hardware 301 (and/or a component thereof, such as the CDU 315) receives one or more host IOs (block 630), the hardware 301 might check to see whether the MaintenanceRegionEnabled bit is set in the VDPT element for that virtual disk. If the bit is set, the hardware 301 determines that a maintenance operation is ongoing when the host IOs are received. At that point, the hardware 301 (e.g., the CDU 315) might look up the stripe boundaries for the maintenance region in the MRT using the MaintenanceRegionTableIndex, as described above. Because firmware 355 has set the LowStripe and HighStripe fields in the MRT entry for that virtual disk, the hardware 301 can define the maintenance region based on these two boundary stripes. It should be noted that, while this example describes the hardware 301 as determining the maintenance region after receiving the host IOs, in other embodiments, the hardware 301 might define the maintenance region before receiving the host IOs.

The method 600 might also comprise determining, for each of the received IOs, a stripe to which the IO is directed (block 635). There are many ways in which different embodiments can make this determination. In some embodiments, for example, each host IO will identify at least one LBA, and the CDU 315 (or another hardware component 301) will calculate the stripe number from the host IO specified LBA, e.g., using the following calculation:

$$n_{stripe} = \frac{n_{LBA} \gg (S_{str} + 4)}{N_{da} * N_{span}}$$

where $n_{stripe}$ is the number of the stripe on which the host IO will be performed, $n_{LBA}$ is the number of the LBA in the host IO, $S_{str}$ is a constant bit shift value that depends on the strip size configured for the virtual disk (which, for example, might range from 0 for a 64 KiB strip size to 2 for a 256 KiB strip size), $N_{da}$ is the number of data arms per span in the virtual disk, and $N_{span}$ is the number of spans over which the virtual disk is written. Thus, if the host IO specified LBA 4096 in a virtual disk with a 64 KiB strip size, 4 data arms per span and two spans, the stripe number for the corresponding drive IO could be expressed as follows:

$$n_{stripe} = \frac{4096 \gg (0 + 4)}{4 * 2}$$

$$n_{stripe} = \frac{4096 \gg (0 + 4)}{4 * 2}$$

$$n_{stripe} = \frac{256}{8} = 32$$

After performing that calculation for each received host IO, the hardware 301 (e.g., CDU 315) might identify a first set of IOs (e.g., host IOs) directed to stripes within the maintenance region and a second set of IOs (e.g., host IOs) directed to stripes outside the maintenance region (block 640). As noted, this identification can be based at least in part on the HighStripe and LowStripe fields in the MRT and/or the stripe to which each of the plurality of IOs is directed. In some cases, the method can include identifying three sets of IOs: a first set directed to stripes in the maintenance region, a second set directed to stripes in the low region, and a third set directed to stripes in the high region. As noted below, in some embodiments (e.g., if the maintenance operation is an OCE or RLM operation), the second set of IOs can be written to the ghost virtual disk and the third set of IOs can be written to the source virtual disk.

In some embodiments, as noted above, the CDU 315 (or other hardware 301) diverts to the firmware 355 each of the IOs (e.g., host IOs) directed to stripes within the maintenance region (block 645). In particular embodiments, the diversion comprises communicating the diverted IOs to the firmware 355 over the task ring. The firmware 355 might receive and/or store the diverted IOs (block 650).

At block 655, the method 600 can comprise performing the maintenance operation. As noted above, several different types of maintenance operations can be performed at this stage, in accordance with various embodiments. Merely by way of example, the maintenance operation might comprise a bad block management operation, an RLM operation, an OCE operation, and/or the like. Exemplary techniques for performing OCE and/or RLM operations are described below in conjunction with FIGS. 8-10B, although other maintenance operations, and/or other techniques for performing OCE and RLM operations, can be employed in various embodiments.

In some embodiments, the method 600 comprises, at block 660, executing the non-diverted IOs (i.e., the IOs directed to stripes outside the maintenance region, such as stripes in a low region or a high region, to name two examples) during the maintenance period. In an aspect, executing the IOs can comprise communicating those IOs (e.g., via the task ring) to particular hardware components 301 (e.g., the IO manager 340, cache manager 330, RAID manager 335, physical disk interface 350, etc.). FIG. 4, discussed above, illustrates an exemplary process that can be used to execute the host IOs. As noted above, if the maintenance operation involves moving LBAs from one stripe to another (e.g., an OCE operation), the execution of the non-diverted IOs can account for the regions to which each host IO is directed. For the host IOs directed to a low region, the hardware can determine that the drive IO(s) resulting from those host IOs will be executed on stripes that already have been expanded, so those drive IOs should be written to the ghost virtual disk. In contrast, if the host IO is directed to stripe(s) in the high region 515, the resulting drive IOs will be written to stripes that have not yet been expanded, and those drive IOs should be written to the source virtual disk. Thus, executing the non-diverted IOs (block 660) can comprise writing one set of IOs (e.g., those directed to a low region) to a ghost virtual disk and writing another set of IOs (e.g., those directed to a high region) to a source virtual disk.

The method 600 might further comprise determining that the one or more maintenance operations has been completed, at least within the current maintenance region (block 665). (For instance, the firmware 355, after completing maintenance on one maintenance region, may restart the maintenance on another set of stripes or rows, thus changing the maintenance region, and, accordingly, the high and low regions). In some embodiments, this determination can be made by firmware when the firmware receives completion notices from the hardware performing the operation (for example, as described below in connection with FIGS. 9A-10B). In another aspect, this determination can be made by the hardware 301 based on an explicit communication from the firmware 355. In other aspects, this determination can be made when a hardware component (e.g., the CDU 315) reviews the VDPT and/or the MRT after the firmware 355 has updated those tables to indicate that the maintenance operation(s) have completed for that maintenance region.

Once the maintenance for a particular maintenance region has been completed, the firmware 355 might resubmit any host IOs that had been diverted during the maintenance operation to be executed at this point (block 670). In an aspect, resubmitting the diverted host IOs can comprise communicating the diverted host IO to the CDU 315 (or another component). This communication might be performed using the task ring. Thus, the method 600 can also comprise receiving the deferred IOs from the firmware 355 (block 675) and/or executing the resubmitted IOs (block 680), e.g. using the process described with respect to FIG. 4, or a similar process.

In some embodiments, the method 600 comprises beginning the maintenance operation on a new region (block 685). At this point, the method 600 can reiterate from block 605, although some of the procedures of maintenance initiation might be unnecessary.

Hardware-Accelerated OCE

In addition to the watermarking techniques discussed above, some embodiments can employ techniques that enhance an OCE operation. (Although these techniques are described below in the context of an OCE operation, similar principles can be used in other embodiments to perform other maintenance operations, including without limitation RLM operations). Many embodiments provide more hardware automation of the OCE process than existing techniques.

As noted above, the stripe size of a virtual disk (expressed in LBAs) of a virtual disk is the row size (i.e., the size of one strip of one arm times the number of arms in a span) multiplied by the number of spans in the virtual disk. Some embodiments take advantage of the hardware capabilities to allow the firmware 355 to expand the ghost virtual disk stripe by stripe. In some cases, the hardware 301 will notify the firmware 355 after expanding each stripe. The firmware 355 can choose to expand one or more stripes of the same ghost disk or one or more stripes of multiple ghost disks simultaneously. That is, in some embodiments, the firmware 355 has the flexibility to choose the number of stripes to expand simultaneously as long as it allocates the required resources to do so.

Certain of these embodiments can provide one or more benefits over existing techniques.

Merely by way of example, existing, firmware driven OCE operations can have relatively poor performance. The performance of the operation drops further with active host IOs because the firmware 355 has to hold the host IOs and resubmit those host IOs between OCE cycles to expand each row. Host IO completions are delayed due to the long hold periods, causing performance perceived by the host to decline substantially. In some embodiments, however, hardware acceleration can improve OCE performance significantly. The hold period in firmware 355 can be shorter, because, as explained below, hardware 301 can expand each stripe on a stripe-by-stripe basis. This can often be done much more quickly than the firmware-driven process, which generally expands the virtual drive row by row. Host IOs are also completed sooner, resulting in relatively higher performance perceived by the host.

In general, OCE can be a very slow operation, especially when the physical drives are hard disk drives (HDD). Often, it takes days to complete an OCE of a single virtual disk of size in the order of TiBs. OCE can also be a very restrictive controller operation—in fact, many controllers allow only one OCE operation at a time and prohibit the creation of new configurations and import of foreign data during an OCE. Some controllers disallow migration of virtual disks from one controller to another, prohibit property updates and/or preserving caches during OCE, disable security during OCE operations, and/or the like. These restrictions can create a poor customer experience. The hardware acceleration of the OCE operation provided by some embodiments reduces the total time required to complete OCE, and therefore the limits the amount of time such restrictions apply, improving the customer experience.

Even though the actual disk IO of OCE is a hardware-internal operation, firmware-generated OCE IOs (both read and write) use MPI frames like host IOs. These OCE IOs have to travel through the complete hardware stack in both incoming and outgoing directions. The techniques provided by some embodiments, however, allow the firmware 355 to send OCE ACIOs directly to hardware 301, eliminating the need for MPI to ACIO conversion. As explained below, in the return path IOs can be completed to firmware 355 from a cache update block and/or the IO Manager instead of the Host Completion Unit (which, as noted above, is the endpoint for host IOs in the controller hardware 301). This can bypass the firmware 355 and HCU 320 during some of the OCE operations, reducing the bottleneck induced by the firmware 355.

When firmware 355 has to read the data from the rows of the source virtual disk and write it to the rows of the ghost virtual disk, the firmware 355 must handle and synchronize the read and write operations of the hardware 301 and manipulate scatter gather lists (SGL) to update addresses of buffers. In certain embodiments, the hardware 301 can remove this burden from the firmware 355, allowing reads and writes to expand a stripe to be completely automated and/or linear in fashion. As explained below, using this automated process, certain embodiments allow the performance of the entire OCE operation without requiring the buffer addresses in the SGL to be modified (unless, in some cases, the OCE operation is interrupted.)

A controller generally will configure a maximum host IO size (for example 1 MiB). Often, however, hardware 301 can support much larger IOs (e.g., 8 MiB per IO). A ghost virtual disk with 256 KiB strip size and 32 arms can have a row size of 8 MiB. However, because of the IO size limitation, firmware 355 often must issue multiple MPI IOs (similar to host IOs) to read or write a row of size greater than 1 MiB, requiring several MPI IOs that would be unnecessary but for the size limitation. In some embodiments, however, the hardware 301 can identify OCE IOs and support large-sized ACIOs, which are internal to the storage controller. The firmware can take full advantage of the 8 MiB IO size supported by hardware 301 and read or write a stripe of maximum supported size in a single iteration using an ACIO transferring 8 MiB data. Similarly, while firmware-submitted MPI IOs add to the virtual disk bandwidth usage and therefore impact resource-based metering calculations to regulate the total virtual disk bandwidth available for the host IOs, hardware-accelerated ACIOs are internal to the controller, and the resources for those ACIOs can be maintained as pre-configured internal pools by firmware 355; the ACIOs therefore need not contribute to the per-disk bandwidth exposed to the host.

As shown in FIG. 2, an OCE operation generally requires the controller to read multiple source rows to write a single ghost row (since the addition of one or more arms to the virtual disk makes each row larger in the ghost virtual disk), this means that a typical OCE operation will require multiple IOs (at least one for each source row) while re-using the same buffers to store the LBAs of each successive row. As a result, the firmware 355 often will write the data read for each source virtual disk row to disk (e.g., using the known Disk Data Format (DDF)) for the purpose of backup. This can further degrade performance. As noted above, however, with hardware acceleration, the IDs and sequence of the buffers allocated for OCE can be retained, and the hardware 301 can read enough LBAs to write an entire ghost stripe size in one read cycle, reducing the need to back up data on another, slower medium like DDF.

Moreover, some controllers offer a row write capability on parity virtual disks. Using certain embodiments, a controller can take advantage of larger maximum stripe IO size of supported hardware 301 to do a full row write of all of the rows in a stripe of the ghost drive, allowing the hardware 301 to generate parity blocks without reading the existing parity blocks (because the ghost stripe's LBAs are written at the same time). Without the hardware acceleration techniques of such embodiments, the controller's smaller maximum IO size restricts this ability to very small row sizes.

Because OCE is firmware-intensive, the controller firmware 355 normally cannot expand multiple rows at a time and generally cannot expand a multi-span virtual disk. As a result, a typical OCE operation supports expansion of only single ghost virtual disk row at a time. But since the hardware 301 in some embodiments automates a complete stripe expansion, firmware 355 involvement is largely limited to instructing the expansion of a stripe and receiving the completion confirmation from hardware 301. So the firmware 355 can choose to expand multiple stripes of one or more virtual disks simultaneously. Additionally, for a multi-span virtual disk (an example of which is illustrated by FIG. 1B) certain embodiments can expand some or all of the rows of the same stripe of the ghost virtual disk, because, as noted, various embodiments can perform expansion at the stripe level, rather than row-by-row serially.

Certain embodiments can also take advantage of multi-threaded hardware 301 for OCE operations. Without the techniques of these embodiments, the limitation of writing the ghost drive row-by-row eliminates this advantage for OCE operations, because writing a single row does not require more than one thread. In contrast, as shown below, in these embodiments, child ACIOs can be processed in parallel in multiple hardware threads.

Certain embodiments can also support, at least under certain circumstances, hardware-accelerated RAID Level Migration (RLM).

In addition to performance benefits, certain embodiments provide enhanced fault tolerance. For instance, in accordance with some embodiments, an OCE operation can be paused with the host IO divert (for a maintenance region) left active. During the pause, host IOs directed to the already expanded region (e.g., rows below the maintenance region) of the virtual disk can be internally serviced from the ghost virtual disk and the rest can be serviced from the source LD. Moreover, in some embodiments the firmware 355 does not need to abort the OCE operation if the source disk becomes unavailable for IOs. Because such embodiments preserve the necessary information, such as the stripe numbers being processed, the operational phase of each stripe and the buffers, etc., the OCE operation can be resumed when the source virtual disk becomes available again.

Figure 8:
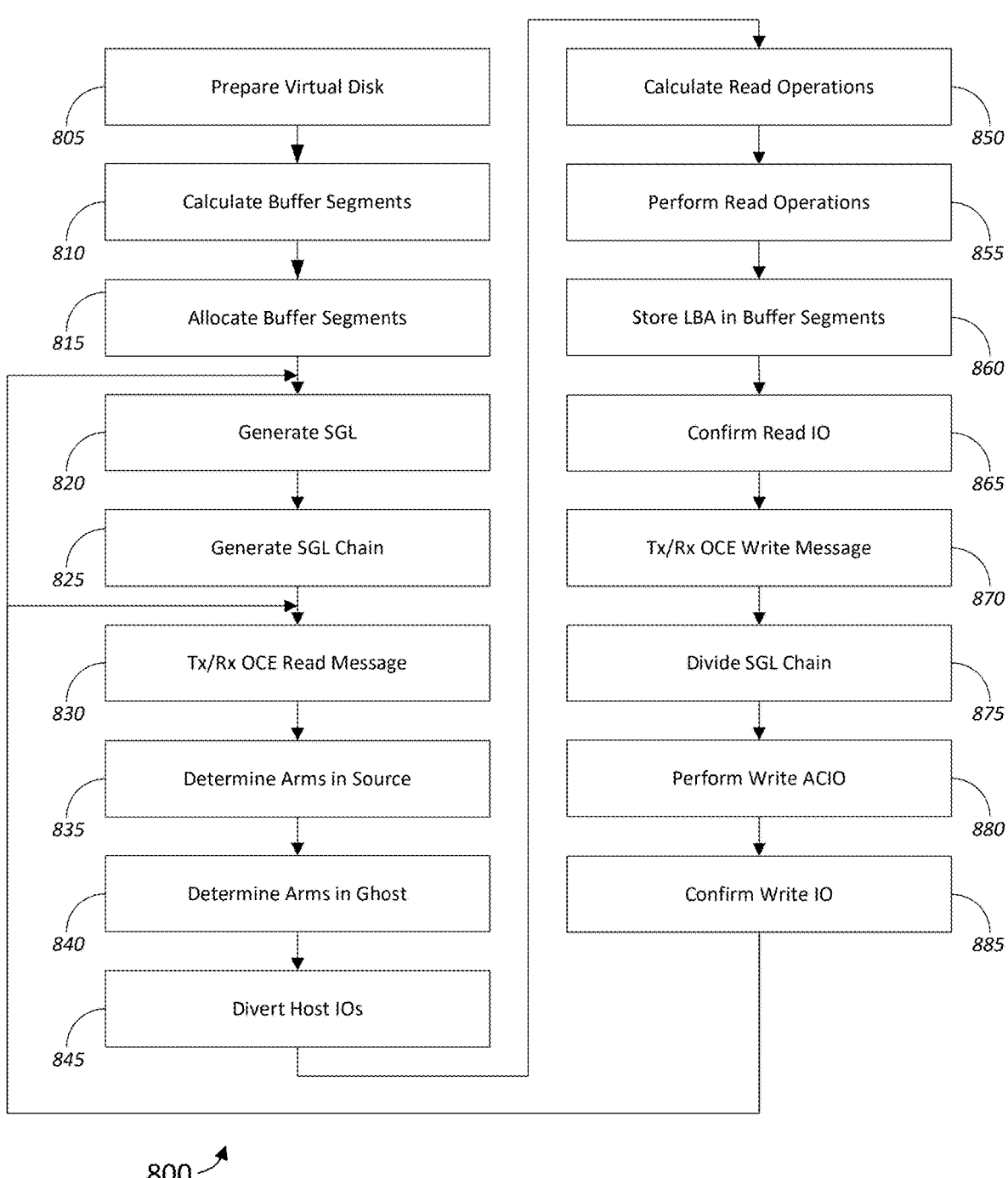
FIG. 8 illustrates a method of performing an online capacity expansion operation on a virtual disk in accordance with some embodiments.

FIG. 8 illustrates a method 800 of performing an operation, one example of which is an OCE operation, which can provide some or all of these benefits (although some embodiments might provide none of these benefits and/or might provide other benefits).

At block 805, the method 800 might comprise preparing the virtual disks for the OCE operation. The preparation operation can employ, for example, some or all of the procedures described in the context of FIG. 7. Merely by way of example, preparation for the OCE operation might comprise modifying the VDPT to indicate that the virtual disk to be expanded is the source virtual disk, to create an VDPT element for the ghost virtual disk, associate the ghost disk as a peer to the source disk, set the MaintenanceRegionEnabled flag in the VDPT elements for the source and/or ghost virtual disks, create or modify appropriate entries in the MRT, and/or the like.

One of the resources allocated by the firmware 355 for an OCE operation is memory to store LBAs during the OCE operation. In some embodiments, the firmware 355 will allocate buffers to store the LBAs as they are read from the source disk, until they can be written to the ghost disk. Generally, a controller will have buffers configured in dynamic RAM (DRAM) (which can be located onboard the controller or elsewhere in the system). In some cases, the buffers are part of the memory of the RAID manager on the controller. Alternatively and/or additionally, the buffers might be stored on disk (e.g., using DDF).

In some cases, the data in the buffers is persisted across a power loss or controller reset. This persistence can allow some embodiments, in case of an interruption, to recover the data read from the source drive and write (or re-write) that data to stripes of the ghost drive which were being processed at the time of interruption.

The method 800 thus can comprise, at block 810, calculating a number of buffer segments sufficient to fill a stripe in the ghost virtual disk and/or, e.g., in embodiments that write more than one stripe per cycle, a number of buffer segments to perform a write phase of a cycle of the operation, in which the write phase writes some number of entire stripes per cycle. In some embodiments, a buffer segment might be sized to hold one or more LBAs. The firmware 355 can calculate the number of buffers sufficient to perform an entire write phase of a cycle using the following expression:

$$N_{buff} = \frac{n(S_{LBA} \times LBA_W)}{S_{buff}}$$

where $N_{buff}$ is the number of buffers sufficient to perform an entire write phase of one cycle of the operation, n denotes the number of stripes to be written per cycle, $S_{LBA}$ is the size of each LBA, $LBA_W$ is a number of LBA written to the ghost virtual disk per child IO, and $S_{buff}$ is the size of each buffer to be allocated. If each cycle writes only one stripe per write phase, n is 1.

In some cases, the buffers can be configured in various sizes (e.g., from 4 KiB to 64 KiB) and each buffer is indexed with an address. The larger sized buffers require fewer buffer IDs to be stored. In an exemplary embodiment, a controller might support a maximum of 32 arms (across all spans) and a maximum strip size of 256 KiB. This configuration allows for a maximum stripe size of 8 MiB. Depending on the maximum number of 8 MiB-sized stripes the firmware 355 determines to write in the ghost virtual disk per OCE cycle, the firmware 355 can calculate the number of buffers needed accordingly.

The method 800 can further comprise allocating the calculated number (or any other number) of buffer segments (block 815). Depending on the embodiment and/or implementation, the firmware 355 might allocate the buffers at runtime or at Start of Day (or startup). In an aspect, certain embodiments can render the allocation of buffers a one-time operation (per OCE), since the same buffer segments can be used for every cycle until the OCE operation is complete. Moreover, in some embodiments, the same buffer segments can be used when OCE is resumed after an interruption. In some cases, if the firmware 355 preallocates a certain number of buffers without calculating the necessary number beforehand, the firmware 355 can use the allocated buffers to process multiple stripes per cycle (e.g., if the stripe size of each ghost LD(s) is less than max possible stripe size and/or as long as complete stripes can be accommodated). Alternatively, the firmware 355 might dynamically allocate buffers at runtime when preparing to start OCE on a virtual disk and store the information in a persistent memory. In this case firmware 355 generally will allocate the calculated number of buffer segments to accommodate the data for each complete stripe size of the ghost virtual disk to be expanded per cycle.

In some embodiments, the device might use scatter gather lists (SGL) to store buffer segment addresses to transfer data during an OCE cycle. In an aspect, each SGL might comprise one or more contiguous scatter gather elements (SGE). In another aspect, each SGE might store an address of a buffer segment sufficient to store one or more contiguous LBAs (depending on the buffer size) read from the source virtual disk in one disk IO.

Depending on the parameters of the OCE operation (e.g. the stripe size of the ghost LD, the number of stripes to write per cycle, etc.), firmware 355 may have to allocate and chain multiple SGLs depending on the stripe size of the ghost LD. After generating the SGL(s) (and if necessary) the SGL chain, firmware 355 might stitch the buffers allocated for the stripe to the SGEs of the SGLs.

In some embodiments, the firmware 355 tracks the sequence in which the buffers are stitched; the SGLs (unlike the buffer segments themselves) might not persist across device resets or interruptions. For example, the stripe number of the ghost virtual disk might be associated with a particular SGL or SGL chain. Because some embodiments write a complete ghost virtual disk stripe in a single cycle and the LBAs on the source virtual disk corresponding to the ghost virtual disk stripe numbers can be calculated from the stripe number of the ghost LD, that stripe number of the ghost virtual disk is sufficient to track the SGE sequence in order to replay the data back in case of an interruption.

If there is no interruption, some embodiments allow stitching the buffers to the SGL to be a one-time step for a complete OCE operation, because there is no need to reorder the buffer segments or reserve/allocate new buffer segments for each OCE cycle (as mentioned above). Such embodiments ensures that the SGL chain formation for the OCE IOs are the same from cycle to cycle. Thus, the method 800 can comprise, at block 825, generating a contiguous SGL chain comprising all of the SGL generated for all of the one or more read IOs. In some embodiments, the method 800 comprises, at block 820, generating a scatter gather list (block 820) and/or generating an SGL chain (block 825).

In some cases, preparing for the OCE operation can include updating the appropriate VDPT element(s) and/or MRT entries to indicate that an OCE operation will be affecting the virtual disk, for example, as described in the context of FIG. 6. At this point, the virtual disk is prepared for the execution of the actual IOs to expand the virtual disk.

In some embodiments, hardware processing for OCE comprises a set of one or more two-phase cycles, with a read phase from the source virtual disk followed by a write phase to the ghost LD. The hardware 301 can use the PeerLD field in the LDCP to identify the source virtual disk and the ghost LD. In some embodiments, the hardware 301 (e.g., the CDU 315) is configured to accept a message from the firmware 355 to initiate the OCE process. Thus, the method 800 can comprise at block 830, transmitting (e.g., by firmware 355)

a message to expand one or more stripes of the virtual disk to include one or more additional arms and/or receiving the message (e.g., with hardware 301, the CDU 315, etc.).

For example, in some embodiments, the firmware 355 might transmit a TRM message to the CDU 315. An example message might be an MSG_EXPAND_LD_STRIPE message, which can include a parent ACIO LMID. In some cases, the firmware 355 will populate the LMID with the ghost virtual disk device handle, opcode READ, stripe number of the ghost virtual disk to be expanded, start SGL ID and type details of the SGL chain that has the buffers stitched. The firmware 355 might also set an ExpansionIO bit in the LMID frame to identify the IO as an OCE IO (i.e., an IO issued as part of the OCE operation) and optionally set a NotifyOnReadComplete bit in the LMID frame to instruct the hardware 301 to notify the firmware 355 when the hardware 301 completes the data read cycle from the source LD. One exemplary use of the NotifyOnReadComplete bit is discussed in further detail below.

The method 800 can comprise, at block 835, determining the number of arms in the source virtual disk and/or, at block 840, determining the number of arms in the ghost virtual disk. In an aspect, the hardware 301 can make this determination by inspecting the appropriate VDPT elements for the source and ghost LDs. As noted above, the ghost virtual disk might comprise a plurality of ghost stripes each having a ghost stripe size.

In some cases, the method 800 can comprise, at block 845, diverting one or more host IOs while the OCE process is ongoing. Merely by way of example, the watermark technique described above can be used to determine regions in which host IOs should or should not be diverted, depending on the stripes affected by the current cycle of the OCE operation, which firmware 355 can set at the beginning of the OCE operation (and/or each cycle thereof) as noted above.

The method 800 can comprise, at block 850, calculating a number of IO read operations, e.g., based on a number of rows in the source virtual disk required to read, at one row per IO read operation, sufficient LBA from the source virtual disk to fill the plurality of buffer segments, which, as noted above, can correspond to the number of LBA to write an entire stripe in the ghost disk. The method 800 can further comprise, at block 855, performing one or more read IOs to read a first plurality of LBAs from the source virtual disk, based at least in part on the ghost stripe size. There are a number of ways in which hardware 301 can read the LBAs from the source disk.

Figure 9A:
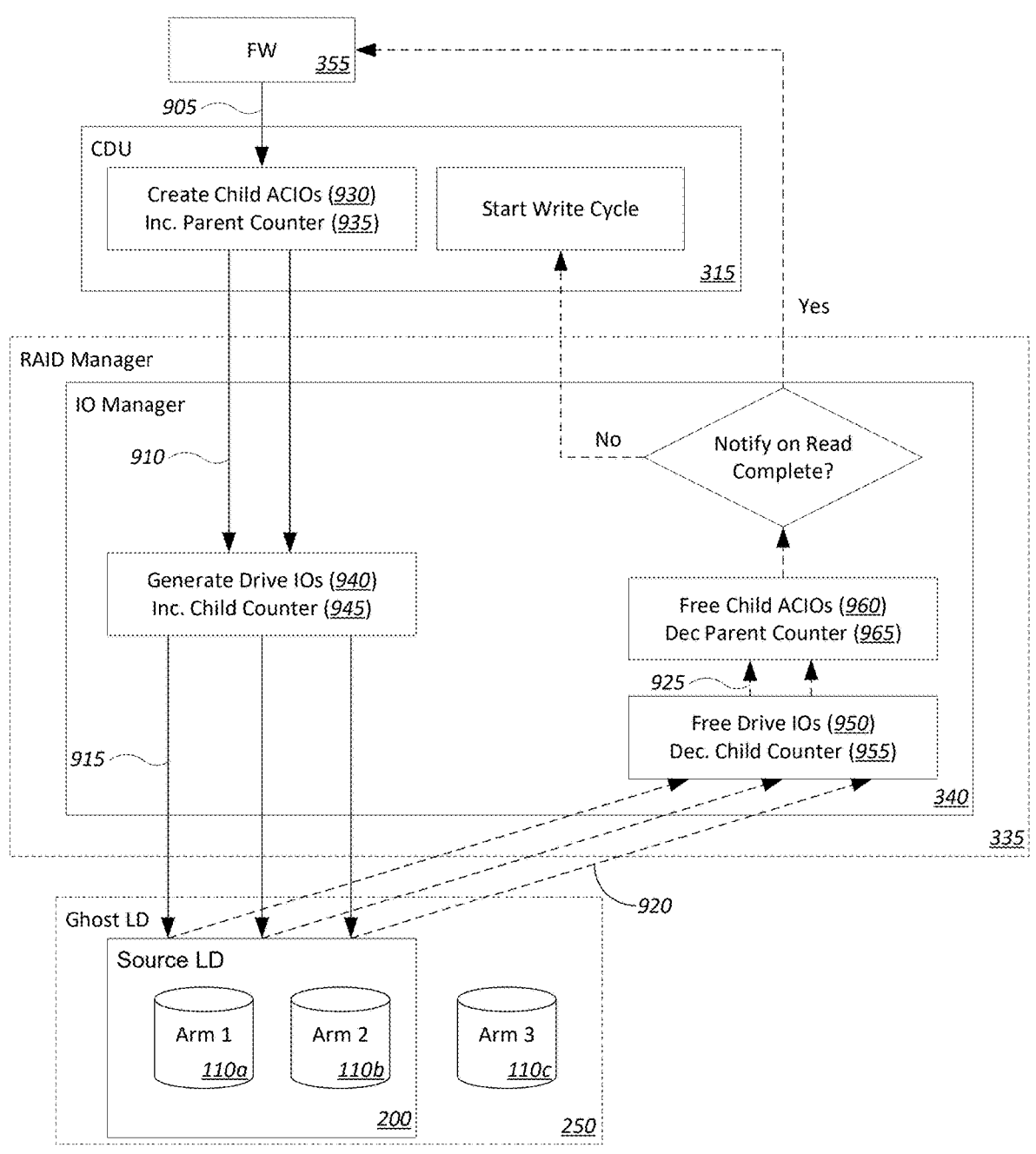
FIGS. 9A and 9B illustrate exemplary read phases of a cycle of an online capacity expansion operation in accordance with some embodiments.
Figure 9B:
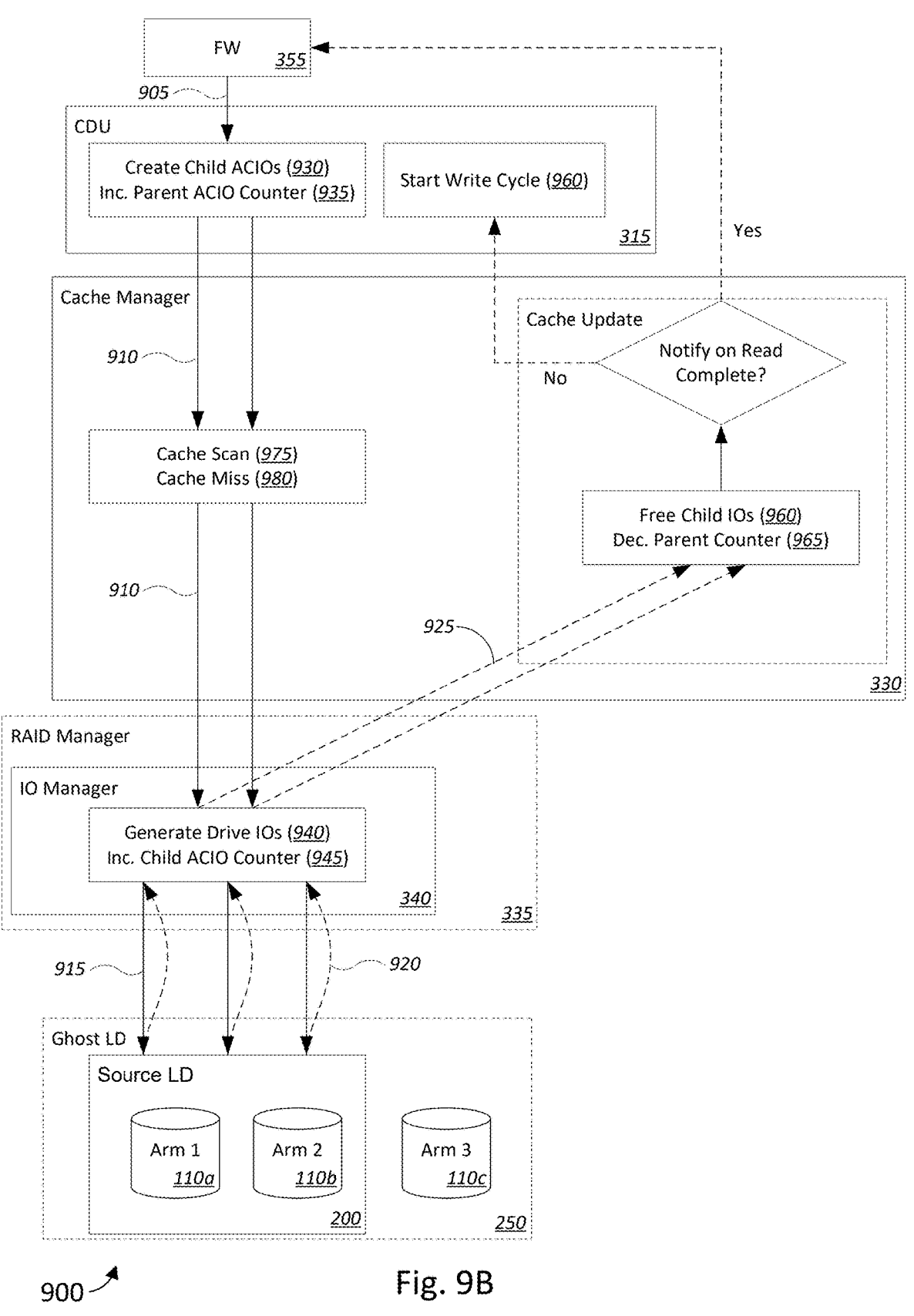

For example, as noted above, the OCE operation might comprise one or more two-stage cycles, in which the first stage includes reading blocks from the source disk and the second stage includes writing blocks to the ghost disk. FIGS. 9A and 9B illustrate non-limiting examples of read cycles in accordance with various embodiments. FIG. 9A illustrates a read phase in which the virtual disk is configured with a RAID level that does not use parity, while FIG. 9B illustrates a read phase 900' of the cycle for a virtual disk with parity blocks and/or uses caching. The read phase 900 of FIG. 9A begins with the CDU 315 receiving a message from the firmware 355, an example of which can be an MSG_EX-PAND_LD_STRIPE message, which, as noted above, can include a parent ACIO 915, which might be an OCE ACIO in some embodiments.

For instance, on receiving the MSG_EXPAND_LD_STRIPE message from firmware 355 having a parent ACIO LMID with the opcode READ, the CDU 315 might initiate the read cycle from the source LD. In one aspect, the CDU

315 calculates the ghost stripe size and start location (LBA) of the ghost stripe from the stripe number (which starts from 0) and the configuration of the ghost LD.

As noted above, the stripe size (in LBA) can be calculated from the strip size, LBA size, the number of arms per span, and the number of spans in the virtual disk. Each of these values is accessible to the CDU 315 (e.g., from the VDPT). The start location can be calculated by multiplying the stripe size by the stripe number, because each stripe, starting with stripe 0, contains the number of LBAs defined by the stripe size). In some embodiments, therefore, the start LBA (identified by number) and number of LBAs to write for expanding a stripe on the ghost virtual disk is the same as the start LBA and number of LBAs to read from the source LD; in many cases, these LBA numbers should remain the same on the ghost virtual disk as on the source virtual disk, since host IOs access data using the same LBA numbers.

At that point, the CDU 315 might create one or more child ACIOs 910 (block 930), for example to allow multithreading the IO read operations and increasing a parent IO counter, which tracks the number of pending parent ACIOs (block 935) and might transmit the child ACIOs 910, e.g., via a LMID for each child ACIO. (As noted above, in some cases, the generation of child ACIOs might be unnecessary, and the CDU 315 might communicate the parent ACIO rather than creating any child ACIOs, in which case the parent ACIO 905 is treated the same as a child ACIO in the remainder of FIG. 9A.

In some cases, the CDU 315 might create child ACIOs 910 based on how many threads are available for IOs, etc. In particular embodiments, however the number of child ACIOs 910 created might depend on the calculation of how many IOs are required to read sufficient rows to write the full ghost stripe specified in the message from firmware 355. For example, in some embodiments, one ACIO LMID (which can be a child ACIO or a parent ACIO depending on whether the generation of children is necessary) is allocated for each (partial or full) row to be read from the source LD.

If child ACIOs are generated, CDU 315 might set, in each child ACIO, the parent ACIO LMID and the ExpansionIO bit so that the other hardware components can identify that the IO is issued for the OCE operation. In an aspect, for each ACIO LMID to be issued to the source LD, the CDU 315 might calculate and/or populate the IO-specific parameters for each row (e.g., by reading the source virtual disk configuration details from the VDPT) and generate child ACIOs until all the LBAs to be read are exhausted. The opcode for each child ACIO might be set to READ.

In the embodiment illustrated by FIG. 9A, regardless of whether the parent ACIO is used or child ACIOs are generated, the IO manager 340 receives the ACIO(s) and, based thereon, generates one or more drive IOs (block 940). In one aspect, the IO manager 340 might create one drive IO 915 for each arm (i.e., physical disk) that needs to be accessed to read the rows corresponding to the child IOs. If child ACIOs are used, the IO manager 340 might also increment a child ACIO counter for each child ACIO received (block 945). The drive IOs 915 then can be sent to, e.g., the physical disk interface 350, not shown on FIG. 9A), to be executed on the individual arms 110 in the source virtual disk 200. Each drive IO will read the LBAs specified in the parent/child IO, and those LBAs are then stored in the buffer segment(s) allocated for those LBAs, according to the order of the SGL/SGL chain. After a drive IO 915 has been executed, a drive completion message 920 can be sent (e.g., by the physical disk interface 350) to the IO manager 340. The IO manager 340 can then release the resources for the drive IOs (block 950).

If the drive IOs were generated from child ACIOs, the method 900 can include decrementing the child ACIO counter (block 955). When the child ACIO counter reaches 0, all of the drive ACIOs 915 for that child ACIO 910 have been successfully completed, and the IO manager 340 can then free the resources linked to the child ACIOs (except perhaps SGL chain and linked buffers in which the read data stored) and the LMID (block 960) and optionally note a child IO completion 925 (although this completion need not be sent to another component). The Parent ACIO counter then can be decremented by 1 for each child ACIO completed (block 965), and the IO manager 340 will note completions 925 for the child IOs.

If the drive IOs were generated from a parent ACIO, the completions for child ACIOs are unnecessary, and the parent ACIO counter can be decremented for each drive IO completed. When all of the child ACIOs (or if none, all of the drive IOs) have been completed, the parent ACIO counter reaches zero, and the IO manager 340 can either indicate to the CDU 315 that the corresponding write cycle should begin, or, if the NotifyOnReadComplete bit of the parent ACIO 905 has been set, notify firmware 355 that the read cycle has been completed. For example, in some embodiments, when the parent ACIO counter becomes 0, the IO manager 340 will check the opcode of the parent ACIO 905. If the opcode is READ and the NotifyOnReadComplete set is also set in the parent ACIO, the IO manager 340 will send a new TRM message MSG_EXPAND_LD_STRIPE_REPLY with the Parent ACIO LMID and a ReadComplete bit set to 1 (to indicate completion of the read cycle) to the firmware 355. If NotifyOnReadComplete is not set, the MSG_EXPAND_LD_STRIPE_REPLY will be sent to CDU 315. Sending the MSG_EXPAND_LD_STRIPE_REPLY to the CDU 315 instead of the firmware 355 is one way in which certain embodiments can further automate the OCE process in hardware 301.

The read cycle 900' of FIG. 9B is similar, except that, as illustrated, the ACIO(s) are first transmitted to the cache manager 330, which will perform a cache scan and, assuming a cache miss (i.e., the LBAs for a particular parent or child ACIO are not in the cache) (block 980), pass the ACIOs 910 to the IO manager 340 for execution as described in conjunction with FIG. 9A. If there is a cache hit, the parent ACIO or child ACIO 910 (in this case a read) can be performed on the cached LBAs without requiring any drive IO, and the parent/child ACIO completions can be returned as described below.

In the case of a cache miss, after receiving the drive IO completions 920 (and/or performing blocks 950 and 955, not pictured in FIG. 9B), the IO manager 340 sends the child IO completions 925 to the cache manager 330 (and/or a cache update function thereof), which performs operations 950-965 and provides the notifications described above. This allows the cache manager 330 to perform these operations (and store the cached LBAs in the appropriate buffer segments) without the need for drive IOs 915 for any child IO 910 that is a cache hit.

Returning to FIG. 8, the method 800 can comprise, at block 860, storing the plurality of LBA read from the source virtual disk. The storing operation can be performed, e.g., by the IO manager 340, during the read cycle 900 or after the read cycle has been completed, depending on the embodiment. In some embodiments, the read LBAs will be stored in buffer segments ordered, e.g., by the SGL chain, in an order the plurality of LBA will be written to the ghost virtual disk. As noted, if appropriate (e.g., if the NotifyOnReadComplete bit is set), the method 800 can comprise, at block 865, notifying the firmware 355 after completion of the one or more IO read operations.

The method 800 can further comprise, at block 870, transmitting message with a message to expand one or more stripes of the virtual disk to include one or more additional arms; in some embodiments. The message comprises a write parent ACIO 1005. Merely by way of example, this message can be similar to the MSG_EXPAND_LD_STRIPE transmitted to prompt a read cycle, including the same parent ACIO LMID and/or other similar parameters, except that the opcode now might be WRITE. As noted above, in some cases, e.g., if the NotifyOnReadComplete is set, firmware 355 might send this message, and in other cases, e.g., if that bit is not set, another hardware component 301 (e.g., IO manager 340 335, cache manager 330 340, etc.) might send that message, or a similar message, such as the MSG_EX-PAND_LD_STRIPE_REPLY returned from the read phase of the cycle. If the message is sent from a hardware component 301, the CDU 315 itself might set the opcode of the parent ACIO to WRITE.

Figure 10A:
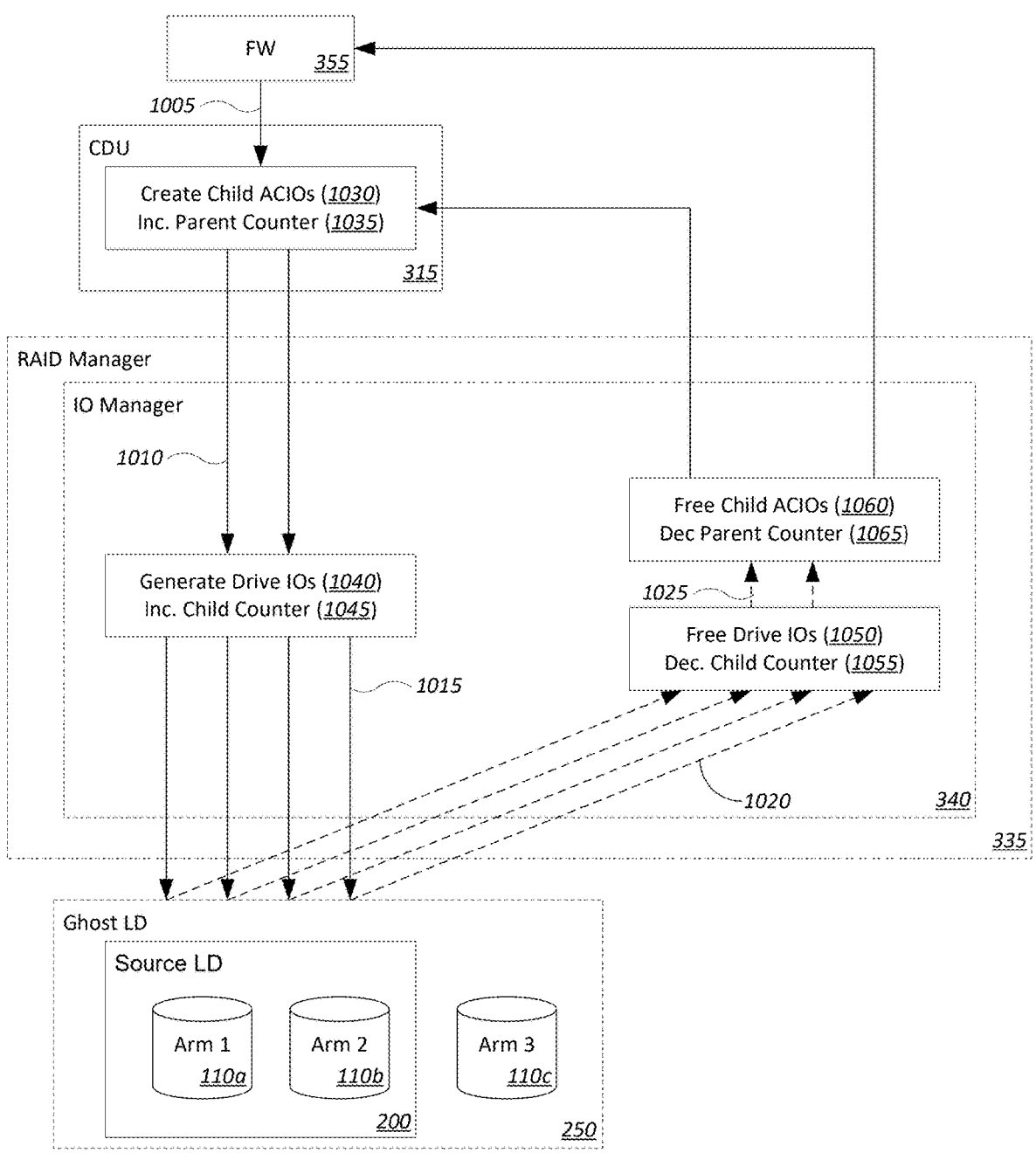
FIGS. 10A and 10B illustrate exemplary write phases of a cycle of an online capacity expansion operation in accordance with some embodiments.
Figure 10B:
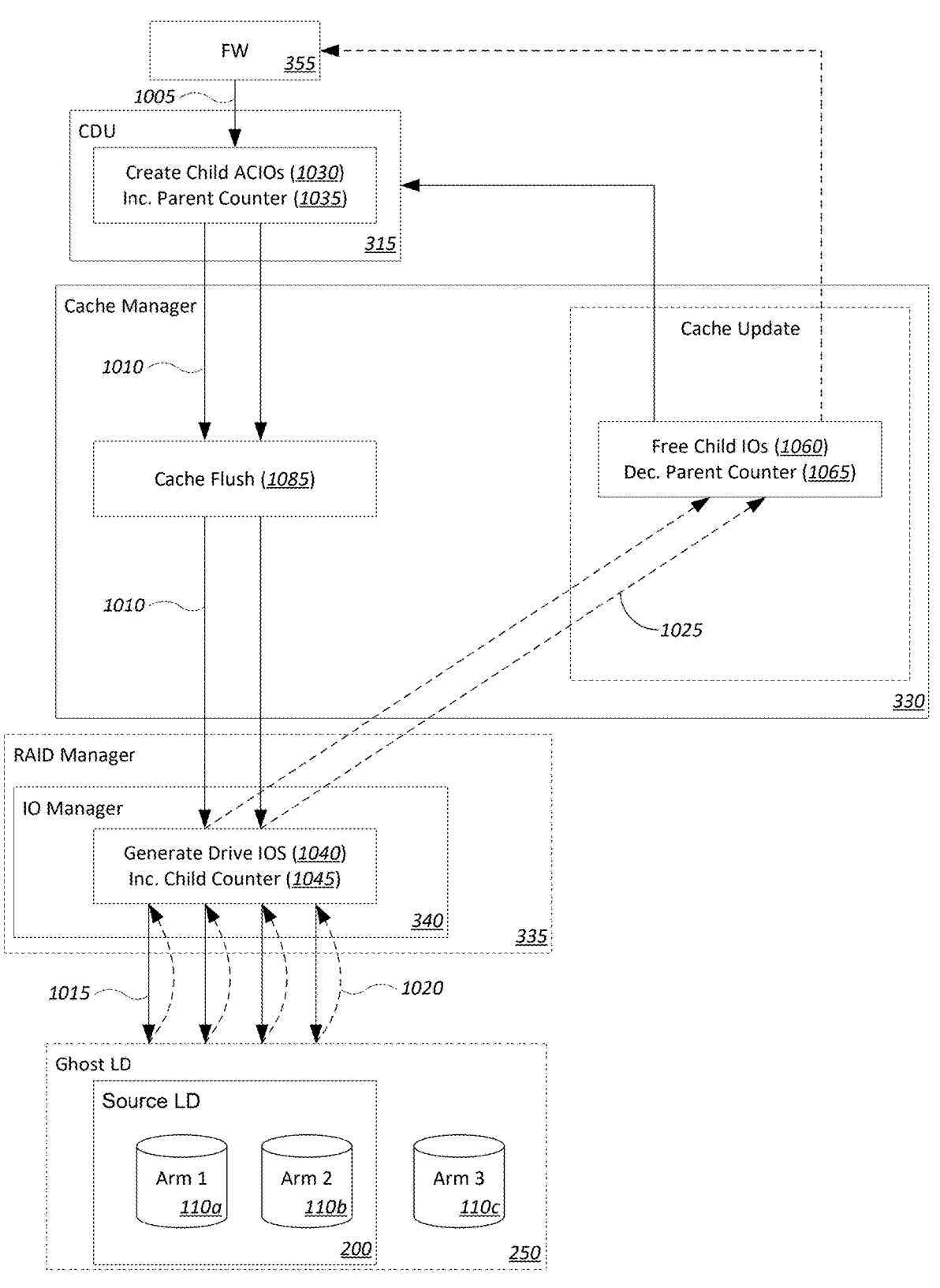

In some embodiments, this will prompt the CDU 315 to begin the write phase of the cycle, examples of which are illustrated by FIG. 10A (which illustrates a write phase 1000 in a non-parity virtual disk that does not employ caching) and FIG. 10B (which illustrates a write phase 1000' in a parity virtual disk or virtual disk that implements caching). The write phase 1000 is roughly analogous to the corresponding read phase 900. For instance, in some embodiments, the CDU 315 sends the parent ACIO LMID (or generates and sends child ACIO LMIDs 1010 to write the data to the stripe of the ghost virtual disk (block 1030). If child ACIOs are not used, the drive IOs will be created from the parent ACIO in a process analogous to that described in FIG. 9A where no child read ACIOs are generated.

In some embodiments, if child ACIOs 1010 are used, the CDU 315 generates a child ACIO 1010 for each row to be written in the ghost virtual disk stripe. The CDU 315 also sets the parent ACIO LMID and ExpansionIO bit in each child ACIO. As in the read cycle, CDU 315 might calculate and/or populate the child ACIOs with the IO-specific parameters for each row (e.g., by reading the ghost virtual disk configuration details from the VDPT) and generate child ACIOs until all the LBAs to be written are exhausted, might set opcode WRITE in each Child ACIO, and/or increment the parent ACIO counter for each child ACIO generated (block 1035). In an aspect, the CDU 315 might distribute the SGL chain in the parent ACIO (e.g., the same SGL chain that was used to perform the read phase) among the child ACIOs contiguously and incrementally. In such cases, the CDU 315 might divide the SGL chain to perform one or more IO write operations (block 875 on FIG. 8) because, for example, the rows to be written by each child ACIO will be larger (due to the expansion of the ghost virtual disk to include more arms), so each child ACIO will need access to more buffer segments than the child IOs used to read the LBA from the source disk.

The method 800 can comprise, at block 880, performing one or more write IOs to write the first plurality of LBA to the ghost virtual disk. For instance, referring to FIGS. 10A and 10B again, the parent ACIO or child ACIOs can be used (e.g., by the IO manager 340) to generate drive IOs (block 1040), the child ACIO counter can be incremented (block 1045), and the drive IOs can be written to the appropriate arms 110 in the ghost virtual disk 250. Once again, the IO manager 340 handles the drive completions 1020 and then handles the completion of the child ACIOs 1025 after the data is written to the drives. When each drive IO is completed, the drive IO resources can be freed (block 1050) and the child ACIO counter can be decremented (block 1055) (or, if no child ACIOs were generated, the parent counter can be decremented as described below). When all of the drive IOs have been completed, the child ACIO counter will be zero, and the child ACIO completions 925 can optionally be sent. At that point, resources for the child ACIOs (except the SGL chain and linked buffers) including the Child ACIO LMIDs can be released (block 1060) and the parent ACIO counter can be decremented for each completed child ACIO (or drive ACIO if no child ACIOs were generated) (block 1065). Once the Parent ACIO counter reaches 0, the cache manager 330 or IO manager 340 (per FIGS. 10A and 10B) can send MSG_EXPAND_LD_STRIPE_REPLY to firmware 355 along with the Parent ACIO and the flag Read-Complete set to 0 (to indicate the completion of the write cycle) to the CDU 315 and/or firmware 355.

As with the read phase 900' above, the write phase 1000' of FIG. 10B can be employed in a virtual disk with caching. In these embodiments, if the LBAs to be written exist in the cache, the cache manager can perform a cache flush operation (block 1085) to write the cache to disk, and no drive IOs need be created from the parent or child ACIO(s). In this case, the cache manager 330 can free the child IO resources (block 1060) if applicable and/or decrement the parent ACIO counter (block 1065). If the LBAs to be written are not in the cache, the cache manager 330 can pass the parent or child ACIOs 1010 to the IO manager 335, which can create and execute the drive IOs 1015, receive the drive completions 1020, and decrement the child ACIO counter as described above. The IO manager 335 can then send the child completions 1025 (or drive completions 1020 if there are no child ACIOs) to the cache manager to process as noted above.

Hence, returning to FIG. 8, the method 800 might comprise, at block 885, confirming the write IO(s). At this point a full cycle of the OCE operation has been performed, and the cycle can repeat from block 820 (if for some reason, new SGLs need to be generated, for example if the cycle was interrupted) or from block 830. The cycles can be reiterated until the entire OCE operation has been completed, for example by the firmware 355 or a hardware component transmitting a first message (e.g., a MSG_EXPAND_LD_STRIPE message with opcode READ) to initiate the read phase of each cycle and transmitting a second message e.g., a MSG_EXPAND_LD_STRIPE message with opcode WRITE or a MSG_EXPAND_LD_STRIPE_REPLY message) to initiate the write phase of each cycle. These messages can be transmitted repeatedly, triggering additional cycles, until the OCE operation is complete. As noted above, the VDPT and/or MRT might be updated after each cycle, e.g., to indicate a new maintenance region comprising the next stripe(s) to be expanded by the following cycle, defined by new low and high stripes.

As noted above, in some cases, the firmware 355 might demand a read complete confirmation (as described with respect to FIG. 9A, for example). This can be useful in many scenarios involving OCE and/or other operations (including without limitation maintenance operations). For example, there may be a risk of overwriting data in a row if read and write can be issued on the same row of the source virtual disk due to expansion a single ghost virtual disk stripe. In this case, the hardware 301 might write the ghost virtual disk stripe only after reading the complete data from the source virtual disk. However, once the write is issued, the original data will be overwritten. So in case of an interruption like power failure, the firmware 355 needs to know whether it should read the LBAs in the buffers from source virtual disk as source data to retry the expansion. To address this, FW can set the NotifyOnReadComplete flag in the Parent ACIO frame before issuing MSG_EXPAND_LD_STRIPE to CDU. When this flag is set, the hardware 301 might send a TRM message MSG_EXPAND_LD_STRIPE_REPLY with the Parent ACIO LMID and a flag ReadComplete set to 1 to FW after the complete read of the source LD for expanding the stripe is done. On receiving this notification, the firmware should persist the read completion status of that stripe number so that, in case of an interruption, the firmware 355 will know that it can read from the buffer segments rather than the source disk to complete the expansion of that stripe (i.e., the write phase to write the LBAs to the ghost virtual disk. Note that this case of overwriting the same row is possible only up to a few number of stripes of the ghost LD which can be expressed using the following expression:

$$N_{OW} = \text{MAX}\left(1, \frac{N_{DAG}}{\text{MAX}(1, N_{DAG} - N_{DAS})}\right) - 1$$

where $N_{OW}$ is the maximum number of stripes that can be overwritten, $N_{DAG}$ is the number of data arms in the ghost virtual disk, and NDAS is the number of data arms in the source virtual disk.

In case of an interruption where the source virtual disk data is already read into the buffers (e.g., the firmware 355 received a proper message such as MSG_EXPAND_LD_STRIPE_REPLY), the firmware 355 can re-stitch the buffers to an SGL and resume expansion of the ghost virtual disk stripe from the write stage by issuing a message, e.g., MSG_EXPAND_LD_STRIPE with the opcode WRITE in the Parent ACIO LMID. If the complete data wasn't read into the buffers (e.g., no MSG_EXPAND_LD_STRIPE_RE-PLY was received), the firmware 355 might re-initiate expansion of the stripe from the beginning.

Similarly, parallel operations (e.g., child ACIOs running in different threads on different arms) can sometimes create the risk the same row on the source virtual disk can be read from and written to simultaneously when the read phase of one stripe of the ghost virtual disk and write phase of the adjacent stripe of the ghost virtual disk are processed in parallel. This is possible only for the first few of stripes of an OCE (or other) operation, because the stripe number being read on the source virtual disk exceeds the stripe number being expanded on ghost virtual disk quickly as OCE progresses. The maximum number of such overlapping stripes can be expressed using the following expression:

$$N_{OW} = \left(\frac{N_{DAG}}{\text{MAX}(1, N_{DAG} - N_{DAS})}\right) + 1$$

where $N_{OW}$ is the maximum number of stripes that can be overwritten, $N_{DAG}$ is the number of data arms in the ghost virtual disk, and NDAS is the number of data arms in the source virtual disk.

In some embodiments, the firmware 355 might be configured to expand this number of initial stripes of the ghost virtual disk one at a time to avoid the risk of overlap. In many cases, the rest of the stripes can be expanded in parallel. It should be noted, however, that some embodiments support reading different LBAs from the same row on the source virtual disk for expanding adjacent stripes of the ghost virtual disk (because this presents no risk of conflicting write operations on the same stripe).

Figure 11:
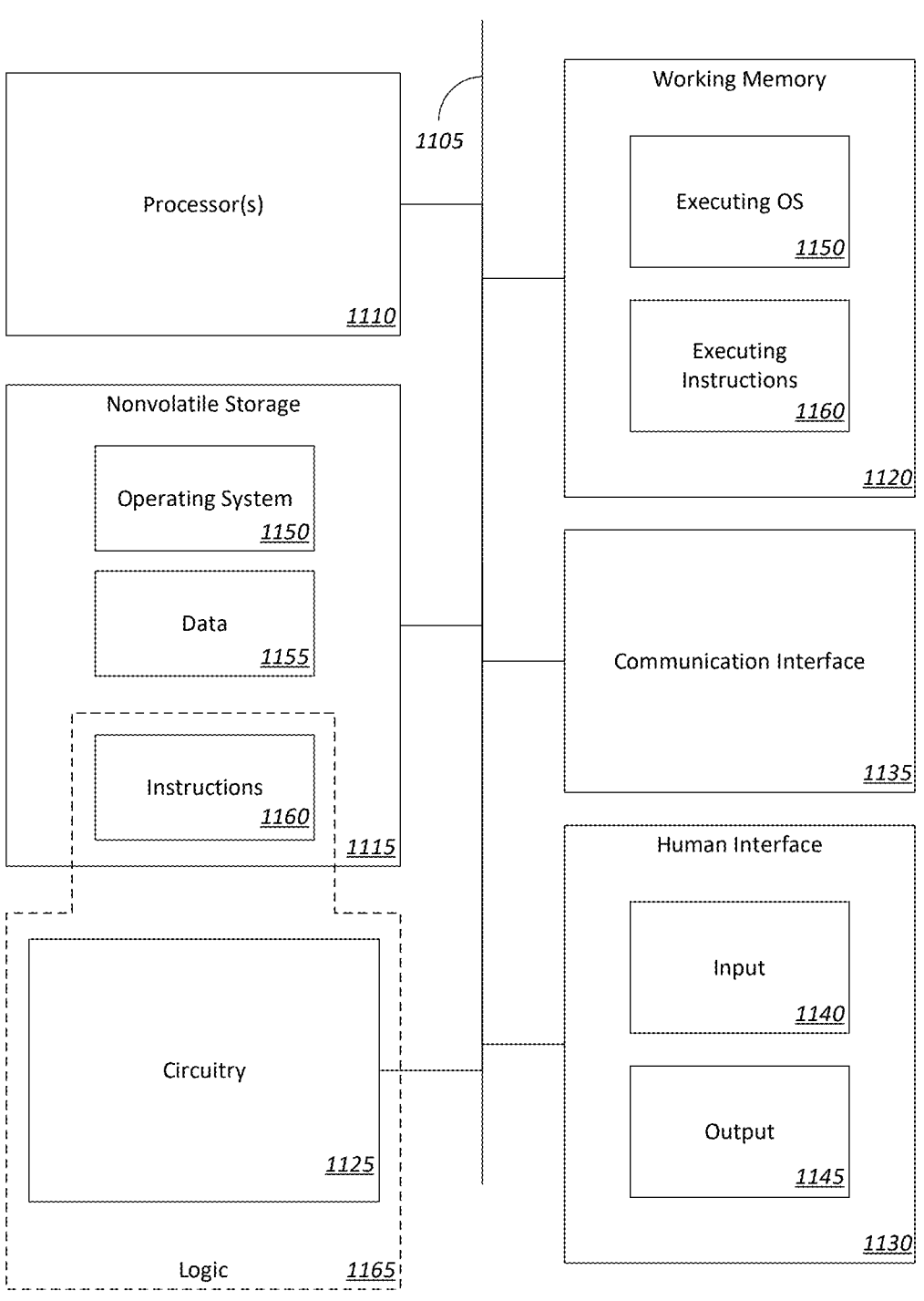
FIG. 11 is a block diagram illustrating example components of a computer system in accordance with some embodiments.

FIG. 11 is a block diagram illustrating an example of a device 1100, which can function as described herein, including without limitation serving as a device, a RAID controller, a host, a computer system (or a component of any of these) in accordance with various embodiments, and/or performing some or all operations of the methods described herein. No component shown in FIG. 11 should be considered necessary or required by each embodiment. For example, many embodiments may not include a processor and/or might be implemented entirely in hardware or firmware circuitry. Similarly, many embodiments may not include input devices, output devices, or network interfaces.

With that prelude, as shown in FIG. 11, the device 1100 may include a bus 1105. The bus 1105 includes one or more components that enable wired and/or wireless communication among the components of the device 1100. The bus 1105 may couple together two or more components of FIG. 11, such as via operative coupling, communicative coupling, electronic coupling, and/or electric coupling. Such components can include a processor 1110, non-volatile storage 1115, working memory (e.g., system dynamic random-access memory (DRAM)) 1120, and/or circuitry 1125. In some cases, the system 1100 can include human interface components 1130 and/or a communication interface 1135.

While these components are displayed as integrated within the device 1100, certain components might be located external from the device 1100. As such, the device 1100 might include, instead of or in addition to the components themselves, facilities for communicating with such external devices, which therefore can be considered part of the device 1100 in some embodiments.

Merely by way of example, the non-volatile storage 1115 can include a hard disk drive (HDD), a solid-state drive (SSD), and/or any other form of persistent storage (i.e., storage that does not require power to maintain the state of the stored data). While such storage often is incorporated within the device 1100 itself, such storage might be external to the device 1100 and can include external HDD, SSD, flash drives, or the like, as well as networked storage (e.g., shared storage on a file server, etc.), storage on a storage area network (SAN), cloud-based storage, and/or the like. Unless the context dictates otherwise, any such storage can be considered part of the device 1100 in accordance with various embodiments.

Similarly, the human interface 1130 can include input components 1140 and/or output components 1145, which can be disposed within the device 1100, external to the device 1100, and/or combinations thereof. The input components 1140 can enable the device 1100 to receive input, such as user input and/or sensed input. For example, the input components 1140 may include a touch screen, a keyboard, a keypad, a mouse, a button, a microphone, a switch, a sensor, a global positioning system sensor, an accelerometer, a gyroscope, and/or an actuator. In some cases, such components can be external to the device 1100 and/or can communicate with components internal to the device 1100 such as input jacks, USB ports, Bluetooth radios, and/or the like. Similarly, the output component 1145 can enable the device 1100 to provide output, such as via a display, a printer, a speaker, and/or the like, any of which can be internal to the device 1100 and/or external to the device but in communication with internal components, such as a USB port, a Bluetooth radio, a video port, and/or the like.

Again, unless the context dictates otherwise, any such components can be considered part of the device 1100 in accordance with various embodiments.

From these examples, it should be appreciated that various embodiments can support a variety of arrangements of external and/or internal components, all of which can be considered part of the device 1100. In certain embodiments, some or all of these components might be virtualized; examples can include virtual machines, containers (such as Docker containers, etc.), cloud computing environments, platform as a service (PAAS) environments, and/or the like.

In an aspect, the nonvolatile storage 1115 can be considered a non-transitory computer readable medium. In some embodiments, the nonvolatile storage 1115 can be used to store software and/or data for use by the device 1100. Such software/data can include an operating system 1150, data 1155, and/or instructions 1160. The operating system can include instructions governing the basic operation of the device 1100 and can include a variety of personal computer or server operating systems, embedded operating systems, and/or the like, depending on the nature of the device 1100. The data 1155 can include any of a variety of data used or produced by the device 1100 (and/or the operation thereof), such as media content, databases, documents, and/or the like. The instructions 1160 can include software code, such as applications, object code, assembly, binary, etc.) used to program the processor 1110 to perform operations in accordance with various embodiments. In an aspect, the operating system 1150 can be considered part of the instructions 1160 in some embodiments.

The processor 1110 can include one or more of a central processing unit, a graphics processing unit, a microprocessor, a controller, a microcontroller, a digital signal processor (DSP), programmable logic (such as a field-programmable gate array (FPGA), an erasable programmable logic device (EPLD), or the like), an application-specific integrated circuit (ASIC), a system on a chip (SoC) and/or another type of processing component. The processor 1110 can be implemented in hardware, firmware, or a combination of hardware, firmware and/or software. In some implementations, the processor 1110 includes one or more processors capable of being programmed to perform one or more operations or processes described elsewhere herein.

For example, in some embodiments, the device 1100 can comprise logic 1165. Such logic can be any sort of code, instructions, circuitry, or the like that can cause the device 1100 to operate in accordance with the embodiments herein (e.g., to perform some or all of the processes and/or operations described herein). Merely by way of example, the logic 1165 can include the instructions 1160, which might be stored on the nonvolatile storage 1115 as noted above, loaded into working memory 1120, and/or executed by the processor 1110 to perform operations and methods in accordance with various embodiments. In an aspect, these instructions 1160 can be considered to be programming the processor 1110 to operate according to such embodiments. In the same way, the operating system 1150 (to the extent it is discrete from the instructions 1160) might be stored on the nonvolatile storage 1115, loaded into working memory 1120, and/or executed by a processor 1110.

Alternatively, and/or additionally, logic can include the circuitry 1125 (e.g., hardware or firmware), which can operate independently of, or collaboratively with, any processor 1110 the device 1100 might or might not have. (As noted above, in some cases, the circuitry 1150 itself can be considered a processor 1110.) The circuitry 1125 might be embodied by a chip, SoC, ASIC, programmable logic device (FPGA, EPLD, etc.), and/or the like. Thus, some or all of the logic enabling or causing the performance of some or all of the operations described herein might be encoded in hardware or firmware circuitry (e.g., circuitry 1150) and executed directly by such circuitry, rather than being software instructions 1160 loaded into working memory 1120. (In some cases, this functionality can be embodied by hardware instructions). Thus, unless the context dictates otherwise, embodiments described herein are not limited to any specific combination of hardware, firmware, and/or software.

The device 1100 can also include a communication interface 1135, which can enable the device 1100 to communicate with other devices via a wired (electrical and/or optical) connection and/or a wireless (RF) connection. For example, the communication interface 1160 may include one or more RF subsystems (such as a Bluetooth subsystem, like those described above, for example, a Wi-Fi subsystem, a 5G or cellular subsystem, etc.). Additionally or alternatively some such systems can be implemented in combination, as discrete chips, as SoCs, and/or the like. The communication interface 1135 can further include a modem, a network interface card, and/or an antenna. In some cases, the communication interface 1130 might comprise a plurality of I/O ports, each of which can be any facility that provides communication between the device 1100 and other devices; in particular embodiments, such ports can network ports, such as Ethernet ports, fiber ports, etc. Other embodiments can include different types of I/O ports, such as serial ports, pinouts, and/or the like. Depending on the nature of the device 1100, the communication interface 1135 can include any standard or proprietary components to allow communication as described in accordance with various embodiments.

EXEMPLARY EMBODIMENTS

The following exemplary embodiments incorporate various features from embodiments described above. These exemplary embodiments, and, in fact all of the embodiments described herein, can be combined in any suitable way.

One set of embodiments provides devices. A RAID controller is an example of one such device. A RAID controller in accordance with some embodiments manages a virtual disk comprising one or more spans, each span comprising one or more arms, each arm corresponding to a physical disk. In some embodiments, the virtual disk further comprises a plurality of stripes, each stripe comprising a row from each of the one or more spans, each row of a span comprising a strip from each of the one or more arms of the span, each strip comprising one or more logical blocks.

In some embodiments, the RAID controller comprises a plurality of components, which might comprise a buffer. The components might further comprise hardware circuitry to receive, e.g., from a firmware, a message to expand one or more stripes of the virtual disk to include one or more additional arms, the message comprising a parent accelerated input/output operation (IO), the parent accelerated IO identifying a ghost stripe to be expanded. The RAID controller might further comprise hardware circuitry to determine a number of arms in a source virtual disk representing the virtual disk prior to expansion and/or hardware circuitry to determine a number of arms in a ghost virtual disk representing the virtual disk after expansion, the ghost virtual disk comprising a plurality of ghost stripes each having a ghost stripe size.

The RAID controller might further comprise hardware circuitry to identify, in the buffer, a plurality of buffer segments sufficient to store sufficient logical blocks (LBA) to write an entire ghost stripe and/or hardware circuitry to generate a first plurality of child accelerated IOs from the parent accelerated IO to read enough LBA from the source virtual disk to fill the plurality of allocated buffer segments. The RAID controller might further comprise hardware circuitry to execute the first plurality of child accelerated IOs and/or hardware circuitry to provide notification after completion of the first plurality of child accelerated IOs;

In some embodiments, The RAID controller furthers comprise hardware circuitry to receive a second message comprising a second parent accelerated IO, hardware circuitry to generate a second plurality of child accelerated IOs from the second parent accelerated IO, hardware circuitry to execute the second plurality of child accelerated IOs to write the LBA from the plurality of buffer segments to the entire identified ghost stripe, and/or hardware circuitry to provide notification after completion of the second plurality of child accelerated IOs.

An exemplary device in accordance with another set of embodiments might comprise hardware circuitry to manage a virtual disk comprising one or more spans, each span comprising one or more arms, each arm comprising a physical disk. In some embodiments, the virtual disk further comprises a plurality of stripes, each stripe comprising a row from each of the one or more spans, each row of a span comprising a strip from each of the one or more arms of the span, each strip comprising one or more logical blocks.

The device might comprise hardware circuitry to determine a number of arms in a source virtual disk representing the virtual disk prior to expansion and/or hardware circuitry to determine a number of arms in a ghost virtual disk representing the virtual disk after expansion, the ghost virtual disk comprising a plurality of ghost stripes each having a ghost stripe size. The device might also comprise hardware circuitry to execute a first one or more IOs to read a first plurality of LBA from the source virtual disk, based at least in part on the ghost stripe size and/or hardware circuitry to execute a second one or more IOs to write the first plurality of LBA to the ghost virtual disk.

In some embodiments, the first plurality of LBA comprises sufficient LBA to write an entire ghost stripe to the ghost virtual disk, and/or the one or more IOs to write the first plurality of LBA to the ghost virtual disk comprises one or more IOs to write the first plurality of LBA to the entire ghost stripe of the ghost virtual disk.

In some embodiments, the device might further comprise hardware circuitry to receive a plurality of host IO and/or hardware circuitry to divert at least some of the plurality of host IOs to a firmware until the first and second one or more IOs have been completed. In some embodiments, the device might further comprise hardware circuitry to identify an affected stripe of the virtual disk for each of the host IO operations and/or hardware to identify a plurality of regions of the virtual disk. In an aspect, the plurality of regions might comprise a first region that has been expanded already, a second region that currently is subject to an expansion operation, and/or a third region that has not yet been expanded. The device, then, might comprise hardware circuitry to identify a first set of host IOs that affect one or more stripes in the first region, a second set of host IOs that affect one or more stripes in the second region, and/or a third set of host IOs that affect one or more stripes in the third region The device might further comprise hardware circuitry to execute the first set of host IOs in the ghost virtual disk, hardware circuitry to divert the second set of host IOs to firmware, and/or hardware circuitry to execute the third set of host IOs in the source virtual disk.

In some embodiments, the first message initiates a first read phase of a first cycle, the first read phase comprising executing the first plurality of child accelerated IOs. In some embodiments, the second message initiates a first write phase of the first cycle, the first write phase comprising executing the second plurality of child accelerated IOs. In some embodiments, the first write phase writes one entire ghost stripe of the ghost virtual disk. In some embodiments, the device further comprises firmware, the firmware comprising instructions executable by a processor. In some embodiments, the instructions comprise instructions to transmit a plurality of first messages, the plurality of first messages including a first message to initiate the read phase of each of a plurality of cycles. Each cycle can comprise a read phase followed by a write phases, until all of the stripes of the ghost virtual drive have been written. In some embodiments, the firmware further comprises instructions to transmit a plurality of second messages, the plurality of second messages including a second message to initiate the write phase of each of the plurality of cycles.

In some embodiments, the device further comprises a buffer and/or hardware circuitry to identify, in the buffer, a plurality of buffer segments allocated based at least in part on the ghost stripe size. In some embodiments, the hardware circuitry to perform the first one or more IOs comprises hardware circuitry to perform the first one or more IOs to read sufficient LBAs from the source virtual disk to fill the plurality of allocated buffer segments, each buffer segment storing one LBA. In some embodiments, the hardware circuitry to perform the second one or more IOs to write the plurality of LBAs to the ghost virtual disk comprises hardware circuitry to perform the second one or more IOs to write the plurality of LBAs from the buffer segments to at least one entire ghost stripe of the ghost virtual disk. In some embodiments, the plurality of buffer segments stores sufficient LBAs to write the at least one entire ghost stripe to the ghost virtual disk.

In some embodiments, the device further comprises hardware circuitry to calculate a number of the first one or more IOs based on a number of rows in the source virtual disk required to read sufficient LBA from the source virtual disk to fill the plurality of buffer segments. In some embodiments, the device further comprises hardware circuitry to store the plurality of LBAs read from the source virtual disk in buffer segments ordered in an order the plurality of LBAs will be written to the ghost virtual disk. In some embodiments, the buffer segments are located in persistent memory, and the device further comprises hardware circuitry to determine, after an interruption, that the first one or more IOs have been completed. In some embodiments, the device further comprises hardware circuitry to perform, after the interruption, at least some of the second one or more IOs operations to write the plurality of LBAs from the buffer segments to the ghost virtual disk.

In some embodiments, the firmware further comprises instructions to allocate a number of buffer segments sufficient to perform an entire write cycle to the ghost virtual disk, and performing an entire write phase of the cycle comprises writing a plurality of stripes to the ghost virtual disk. In some embodiments, these instructions can include instructions to calculate the number of buffer segments sufficient to do so.

In some embodiments, the device comprises hardware circuitry to receive a first message to expand one or more stripes of the virtual disk to include one or more additional arms; the message might comprise a first parent accelerated IO. The device might further comprise hardware circuitry to receive a second message after completion of the one or more IO; the second message might comprise a second accelerated IO. In certain embodiments, the hardware circuitry to perform the first one or more IOs comprises hardware circuitry to perform a first plurality of child accelerated IOs to read the plurality of LBA, based on the first parent accelerated IO, and/or the hardware circuitry to perform the second one or more IOs comprises hardware circuitry to perform a second plurality of child accelerated IOs to write the plurality of LBA to the ghost virtual disk, based on the second parent accelerated IO. In some cases, the second message might be received from a hardware component, the first parent accelerated IO might comprise a READ opcode, and the second parent accelerated IO might have the same or similar parameters as the first accelerated IO. In such cases, the device might further comprise hardware circuitry to modify the second accelerated IO to comprise a WRITE opcode.

In some embodiments, the device comprises hardware circuitry to generate the first plurality of child accelerated IOs from the first parent accelerated IO and/or hardware circuitry to generate the second plurality of child accelerated IOs from the second parent accelerated IO. In some embodiments, the hardware circuitry performs at least some of the first plurality of child IOs in parallel, and/or the hardware circuitry performs at least some of the second plurality of child IOs in parallel.

In some embodiments, the firmware further comprises instructions to generate a scatter gather list (SGL) for each the first one or more IOs. In some embodiments, each of the first one or more IOs reads one or more LBA from a single row of the source virtual disk, each SGL comprises one or more contiguous scatter gather elements (SGE), each SGE stores an address of a buffer segment to store one of the one or more LBA read from the source virtual disk by each of the first one or more IOs. The firmware might comprise instructions to generate a contiguous SGL chain comprising all of the SGL generated for all of the first one or more IOs. In some embodiments, device comprises hardware circuitry to divide the SGL chain to execute the second one or more IOs; each of the second one or more IOs might write one or more of the stored LBA into one row of the entire ghost stripe of the ghost virtual disk, and/or dividing the SGL chain might comprise dividing at least one of the SGL into two sets of SGE, according to the size of each row of the entire ghost stripe of the virtual disk.

An exemplary method according to another set of embodiments might expand a virtual disk spanning one or more spans, each span comprising one or more arms, each arm comprising a physical disk. The virtual disk might comprise a plurality of stripes, each stripe comprising a row from each of the one or more spans, each row of a span comprising a plurality of logical blocks, the plurality of logical blocks comprising one or more logical blocks from each of the arms of the span.

In some embodiments, the method might comprise determining a number of arms in a source virtual disk representing the virtual disk prior to expansion and/or determining a number of arms in a ghost virtual disk representing the virtual disk after expansion. In some embodiments, the ghost virtual disk comprises a plurality of ghost stripes each having a ghost stripe size, and the method might executing a first one or more IOs to read a first plurality of LBA from the source virtual disk, based at least in part on the ghost stripe size, and/or executing a second one or more IOs to write the first plurality of LBA to the ghost virtual disk.

CONCLUSION

In the foregoing description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Thus, the foregoing description provides illustration and description of some features and aspect of various embodiments, but it is not intended to be exhaustive or to limit the implementations to the precise form disclosed. One skilled in the art will recognize that modifications may be made in light of the above disclosure or may be acquired from practice of the implementations, all of which can fall within the scope of various embodiments. For example, as noted above, the methods and processes described herein may be implemented using software components, firmware and/or hardware components, (including without limitation processors, other hardware circuitry, custom integrated circuits (ICs), programmable logic, etc.) and/or any combination thereof.

Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Likewise, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise.

As used herein, the term "component" is intended to be broadly construed as hardware, firmware, or a combination of hardware and software unless expressly stated otherwise (e.g., "hardware component" is limited to hardware). It will be apparent that systems and/or methods described herein may be implemented in different forms of hardware, firmware, and/or a combination of hardware and software. The actual specialized control hardware or software code used to implement these systems and/or methods does not limit the implementations unless specifically recited in the claims below. Thus, when the operation and behavior of the systems and/or methods are described herein without reference to specific software code, one skilled in the art would understand that software and hardware can be used to implement the systems and/or methods based on the description herein.

In this disclosure, when an element is referred to herein as being "connected" or "coupled" to another element, it is to be understood that one element can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not preclude other connections, in which intervening elements may be present. Similarly, while the methods and processes described herein may be described in a particular order for ease of description, it should be understood that, unless the context dictates otherwise, intervening processes may take place before and/or after any portion of the described process, and, as noted above, described procedures may be reordered, added, and/or omitted in accordance with various embodiments.

In this application, the use of the singular includes the plural unless specifically stated otherwise, and use of the term "and" means "and/or" unless otherwise indicated. Also, as used herein, the term "or" is intended to be inclusive when used in a series and also may be used interchangeably with "and/or," unless explicitly stated otherwise (e.g., if used in combination with "either" or "only one of"). Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Unless otherwise indicated, all numbers used herein to express quantities, dimensions, and so forth should be understood as being modified in all instances by the term "about." As used herein, the articles "a" and "an" are intended to include one or more items and may be used interchangeably with "one or more." Similarly, as used herein, the article "the" is intended to include one or more items referenced in connection with the article "the" and may be used interchangeably with "the one or more." As used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. In the foregoing description, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Thus, while each dependent claim listed below may directly depend on only one claim, the disclosure of various implementations includes each dependent claim in combination with every other claim in the claim set. No element, act, or instruction used herein should be construed as critical or essential unless explicitly described as such.

The invention claimed is:

1. A redundant array of independent disks (RAID) controller to manage a virtual disk comprising one or more spans, each span comprising one or more arms, each arm corresponding a physical disk, the virtual disk further comprising a plurality of stripes, each stripe comprising a row from each of the one or more spans, each row of a span comprising a strip from each of the one or more arms of the span, each strip comprising one or more logical blocks, the RAID controller comprising a plurality of components, the plurality of components comprising:

a buffer;

hardware circuitry to receive a message to expand one or more stripes of the virtual disk to include one or more additional arms, the message comprising a parent accelerated input/output operation (IO), the parent accelerated IO identifying a ghost stripe to be expanded;

hardware circuitry to determine a number of arms in a source virtual disk representing the virtual disk prior to expansion;

hardware circuitry to determine a number of arms in a ghost virtual disk representing the virtual disk after expansion, the ghost virtual disk comprising a plurality of ghost stripes each having a ghost stripe size;

hardware circuitry to identify, in the buffer, a plurality of buffer segments sufficient to store sufficient logical blocks (LBA) to write an entire ghost stripe;

hardware circuitry to generate a first plurality of child accelerated IOs from the parent accelerated IO to read enough LBA from the source virtual disk to fill the plurality of allocated buffer segments;

hardware circuitry to execute the first plurality of child accelerated IOs;

hardware circuitry to provide notification after completion of the first plurality of child accelerated IOs;

hardware circuitry to receive a second message comprising a second parent accelerated IO;

hardware circuitry to generate a second plurality of child accelerated IOs from the second parent accelerated IO;

hardware circuitry to execute the second plurality of child accelerated IOs to write the LBA from the plurality of buffer segments to the entire identified ghost stripe; and hardware circuitry to provide notification after completion of the second plurality of child accelerated IOs.

2. A device, comprising:

hardware circuitry to manage a virtual disk comprising one or more spans, each span comprising one or more arms, each arm comprising a physical disk, the virtual disk further comprising a plurality of stripes, each stripe comprising a row from each of the one or more spans, each row of a span comprising a strip from each of the one or more arms of the span, each strip comprising one or more logical blocks (LBA);

hardware circuitry to receive a first message to expand one or more stripes of the virtual disk to include one or more additional arms, the message comprising a first parent accelerated IO;

hardware circuitry to determine a number of arms in a source virtual disk representing the virtual disk prior to expansion;

hardware circuitry to determine a number of arms in a ghost virtual disk representing the virtual disk after expansion, the ghost virtual disk comprising a plurality of ghost stripes each having a ghost stripe size;

hardware circuitry perform a first plurality of child accelerated IOs to read the plurality of LBAs from the source virtual disk, based on the first parent accelerated IO, and based at least in part on the ghost stripe size;

hardware circuitry to receive a second message after completion of the one or more first plurality of child accelerated IOs, the second message comprising a second accelerated IO; and hardware circuitry to perform a second plurality of child accelerated IOs to write the plurality of LBA to the ghost virtual disk, based on the second parent accelerated IO.

3. The device of claim 2, wherein:

the first plurality of LBAs comprises a sufficient number of LBAs to write at least one entire ghost stripe to the ghost virtual disk; and the one or more IOs to write the first plurality of LBAs to the ghost virtual disk comprises one or more IOs to write the first plurality of LBAs to the at least one entire ghost stripe of the ghost virtual disk.

4. The device of claim 2, further comprising:

hardware circuitry to receive a plurality of host IOs; and hardware circuitry to divert at least some of the plurality of host IOs to a firmware until the first and second parent IOs have been completed.

5. The device of claim 4, further comprising:

hardware circuitry to identify an affected stripe of the virtual disk for each of the host IO operations;

hardware to identify a plurality of regions of the virtual disk, the plurality of regions comprising:

a first region that has already been expanded;

a second region that is currently subject to an expansion operation; and a third region that has not yet been expanded;

hardware circuitry to identify a first set of host IOs that affect one or more stripes in the first region, a second set of host IOs that affect one or more stripes in the second region, and a third set of host IOs that affect one or more stripes in the third region;

hardware circuitry to execute the first set of host IOs in the ghost virtual disk;

hardware circuitry to divert the second set of host IOs to firmware; and hardware circuitry to execute the third set of host IOs in the source virtual disk.

6. The device of claim 2, wherein:

the second message is received from a hardware component;

the first parent accelerated IO comprises a READ opcode;

the second parent accelerated IO is has the same parameters as to the first parent accelerated IO; and the device further comprises:

hardware circuitry to modify the second accelerated IO to comprise a WRITE opcode.

7. The device of claim 2, further comprising:

hardware circuitry to generate the first plurality of child accelerated IOs from the first parent accelerated IO; and hardware circuitry to generate the second plurality of child accelerated IOs from the second parent accelerated IO.

8. The device of claim 2, wherein:

the hardware circuitry performs at least some of the first plurality of child IOs in parallel; and the hardware circuitry performs at least some of the second plurality of child IOs in parallel.

9. The device of claim 2, wherein:

the first message initiates a first read phase of a first cycle, the first read phase comprising executing the first plurality of child accelerated IOs;

the second message initiates a first write phase of the first cycle, the first write phase comprising executing the second plurality of child accelerated IOs;

the first write phase writes one entire ghost stripe of the ghost virtual disk; and the device further comprises firmware, the firmware comprising instructions executable by a processors, the instructions comprising:

instructions to transmit a plurality of first messages, the plurality of first messages including a first message to initiate the read phase of each of a plurality of cycles, each cycle comprising a read phase followed by a write phases, until all of the stripes of the ghost virtual drive have been written.

10. The device of claim 9, wherein the plurality of second messages including a second message to initiate the write phase of each of the plurality of cycles.

11. The device of claim 9, further comprising:

a buffer; and hardware circuitry to identify, in the buffer, a plurality of buffer segments allocated based at least in part on the ghost stripe size, wherein:

the hardware circuitry to perform the first one or more IOs comprises:

hardware circuitry to perform the first one or more IOs to read sufficient LBAs from the source virtual disk to fill the plurality of allocated buffer segments, each buffer segment storing one LBA; and the hardware circuitry to perform the second one or more IOs to write the plurality of LBAs to the ghost virtual disk comprises:

hardware circuitry to perform the second one or more IOs to write the plurality of LBAs from the buffer segments to at least one entire ghost stripe of the ghost virtual disk; and the plurality of buffer segments stores sufficient LBAs to write the at least one entire ghost stripe to the ghost virtual disk.

12. The device of claim 11, further comprising:

hardware circuitry to calculate a number of the first one or more IOs based on a number of rows in the source virtual disk required to read sufficient LBA from the source virtual disk to fill the plurality of buffer segments.

13. The device of claim 11, further comprising:

hardware circuitry to store the plurality of LBAs read from the source virtual disk in buffer segments ordered in an order the plurality of LBAs will be written to the ghost virtual disk.

14. The device of claim 11, wherein:

the buffer segments are located in persistent memory; and the device further comprises:

hardware circuitry to determine, after an interruption, that the first one or more IOs have been completed; and hardware circuitry to perform, after the interruption, at least some of the second one or more IOs operations to write the plurality of LBAs from the buffer segments to the ghost virtual disk.

15. The device of claim 11, wherein the firmware further comprises:

instructions to allocate a number of buffer segments required to perform an entire write phase of the cycle, and wherein performing an entire write phase of the cycle comprises writing a plurality of stripes to the ghost virtual disk.

16. The device of claim 15, wherein the instructions to allocate a number of buffer segments sufficient to perform an entire write cycle comprises instructions to calculate a number of buffer segments sufficient to perform an entire write cycle using the following expression:

$$N_{buff} = \frac{n(S_{LBA} \times LBA_W)}{S_{buff}}$$

where $N_{buff}$ is the number of buffers sufficient to perform an entire write phase of one cycle of the operation, n denotes the number of stripes to be written per cycle, $S_{LBA}$ is the size of each LBA, $LBA_W$ is a number of LBA written to the ghost virtual disk per child IO, and $S_{buff}$ is the size of each buffer to be allocated.

17. The device of claim 15, wherein the firmware further comprises:

instructions to generate a scatter gather list (SGL) for each the first one or more IOs, wherein:

each of the first one or more IOs reads one or more LBA from a single row of the source virtual disk;

each SGL comprises one or more contiguous scatter gather elements (SGE);

each SGE stores an address of a buffer segment to store one of the one or more LBA read from the source virtual disk by each of the first one or more IOs; and instructions to generate a contiguous SGL chain comprising all of the SGL generated for all of the first one or more IOs.

18. The device of claim 17, wherein the device further comprises:

hardware circuitry to divide the SGL chain to execute the second one or more IOs, wherein:

each of the second one or more IOs writes one or more of the stored LBA into one row of the entire ghost stripe of the ghost virtual disk; and dividing the SGL chain comprises dividing at least one of the SGL into two sets of SGE, according to the size of each row of the entire ghost stripe of the virtual disk.

19. A method of expanding a virtual disk spanning one or more spans, each span comprising one or more arms, each arm comprising a physical disk, the virtual disk comprising a plurality of stripes, each stripe comprising a row from each of the one or more spans, each row of a span comprising a plurality of logical blocks, the plurality of logical blocks comprising one or more logical blocks from each of the arms of the span, the method comprising:

receive a first message to expand one or more stripes of the virtual disk to include one or more additional arms, the message comprising a first parent accelerated IO;

determining a number of arms in a source virtual disk representing the virtual disk prior to expansion;

determining a number of arms in a ghost virtual disk representing the virtual disk after expansion, the ghost virtual disk comprising a plurality of ghost stripes each having a ghost stripe size;

performing a first plurality of child accelerated IOs to read the plurality of LBAs from the source virtual disk, based on the first parent accelerated IO, and based at least in part on the ghost stripe size;

receiving a second message after completion of the one or more first plurality of child accelerated IOs, the second message comprising a second accelerated IO; and performing a second plurality of child accelerated IOs to write the plurality of LBA to the ghost virtual disk, based on the second parent accelerated IO.

20. The method of claim 19, further comprising:
receiving a plurality of host IOs; and
diverting at least some of the plurality of host IOs to a firmware until the first and second parent IOs have been completed.

\* \* \* \* \*